United States Patent
Casey et al.

(10) Patent No.: US 7,240,361 B2
(45) Date of Patent: Jul. 3, 2007

(54) SYSTEMS AND METHODS FOR CONTROLLED TRANSMITTANCE IN A TELECOMMUNICATION SYSTEM

(75) Inventors: Steven M. Casey, Littleton, CO (US); Bruce A. Phillips, Erie, CO (US)

(73) Assignee: Qwest Communications International Inc., Denver, CO (US)

( * ) Notice: Subject to any disclaimer, the term of this patent is extended or adjusted under 35 U.S.C. 154(b) by 802 days.

(21) Appl. No.: 10/632,602

(22) Filed: Aug. 1, 2003

(65) Prior Publication Data
US 2004/0153670 A1 Aug. 5, 2004

Related U.S. Application Data

(63) Continuation-in-part of application No. 10/452,996, filed on Jun. 2, 2003, and a continuation-in-part of application No. 10/367,596, filed on Feb. 14, 2003, and a continuation-in-part of application No. 10/367,597, filed on Feb. 14, 2003, and a continuation-in-part of application No. 10/356,364, filed on Jan. 31, 2003, and a continuation-in-part of application No. 10/356,688, filed on Jan. 31, 2003, and a continuation-in-part of application No. 10/356,338, filed on Jan. 31, 2003.

(51) Int. Cl.
*G06F 17/30* (2006.01)
(52) U.S. Cl. .................. 726/2; 726/3; 726/4; 726/8
(58) Field of Classification Search ........... 726/2–10, 726/27–30; 713/168
See application file for complete search history.

(56) References Cited

U.S. PATENT DOCUMENTS

| | | | |
|---|---|---|---|
| 4,775,997 A | 10/1988 | West, Jr. et al. | |
| 4,959,719 A | 9/1990 | Strubbe et al. | |
| 4,989,230 A | 1/1991 | Gillig et al. | |
| 5,202,765 A | 4/1993 | Lineberry | |
| 5,418,559 A | 5/1995 | Blahut | |
| 5,488,412 A | 1/1996 | Majeti et al. | |
| 5,526,403 A | 6/1996 | Tam | |
| 5,585,837 A | 12/1996 | Nixon | |
| 5,635,980 A | 6/1997 | Lin et al. | |
| 5,638,112 A | 6/1997 | Bestler et al. | |
| 5,740,075 A | 4/1998 | Bigham et al. | |

(Continued)

OTHER PUBLICATIONS

Frank, Edward and Holloway, Jack; "Connecting the Home with a Phone Line Network Chip Set", IEEE Micro, Mar.-Apr. 2000, pp. 2-14.

(Continued)

*Primary Examiner*—Hosuk Song
(74) *Attorney, Agent, or Firm*—Townsend and Townsend and Crew LLP

(57) ABSTRACT

Systems and methods for authenticating digital assets in relation to a telecommunications network. In various cases, the systems include a network interface device associated with a customer premises. The network interface device includes a local authentication authority operable to authenticate one or more digital assets maintained in relation to the customer premises. In some cases, a global authentication authority can authenticate the network interface device, and implicitly authenticate the one or more digital assets. Many other cases and/or embodiments are disclosed herein.

25 Claims, 11 Drawing Sheets

U.S. PATENT DOCUMENTS

| | | |
|---|---|---|
| 5,771,465 A | 6/1998 | Böjeryd |
| 5,784,683 A | 7/1998 | Sistanizadeh et al. |
| 5,790,201 A | 8/1998 | Antos |
| 5,923,379 A | 7/1999 | Patterson |
| 5,971,921 A | 10/1999 | Timbel |
| 5,983,068 A | 11/1999 | Tomich et al. |
| 6,012,100 A | 1/2000 | Frailong et al. |
| 6,069,899 A | 5/2000 | Foley |
| 6,128,389 A * | 10/2000 | Chan et al. ............ 380/247 |
| 6,209,025 B1 | 3/2001 | Bellamy |
| 6,282,189 B1 | 8/2001 | Eames |
| 6,288,749 B1 | 9/2001 | Freadman |
| 6,359,973 B1 | 3/2002 | Rahamim et al. |
| 6,481,013 B1 | 11/2002 | Dinwiddie et al. |
| 6,542,500 B1 | 4/2003 | Gerszberg et al. |
| 6,687,374 B2 | 2/2004 | Leuca et al. |
| 6,833,877 B2 | 12/2004 | Wang |
| 6,882,714 B2 | 4/2005 | Mansfield |
| 6,894,999 B1 | 5/2005 | Acharya |
| 6,898,413 B2 | 5/2005 | Yip et al. |
| 7,032,241 B1 * | 4/2006 | Venkatachary et al. ........ 726/4 |
| 2001/0021997 A1 | 9/2001 | Lee |
| 2001/0051980 A1 | 12/2001 | Raciborski et al. |
| 2002/0037004 A1 | 3/2002 | Bossemeyer et al. |
| 2002/0110115 A1 | 8/2002 | Gorman et al. |
| 2003/0026416 A1 | 2/2003 | Fusco |
| 2003/0179858 A1 | 9/2003 | Bella et al. |
| 2004/0136373 A1 | 7/2004 | Bareis |
| 2004/0213286 A1 | 10/2004 | Jette et al. |
| 2004/0252675 A1 | 12/2004 | Lund |

OTHER PUBLICATIONS

NextNet Wireless, NextNet Expedience, NLOS Plug-and-Play Portable Customer Premise Equipment Integrated Radio Modem, Non Line-of-Sight Broadband Wireless Residential Subscriber Unit (RSU-2510A), http://www.nextnetwireless.com/assets/news/media/PDF/rsu_2510AMOD_rev1.pdf, Sep. 21, 2004, 2 pages.

* cited by examiner

SYSTEMS AND METHODS FOR CONTROLLED TRANSMITTANCE IN A TELECOMMUNICATION SYSTEM

CROSS-REFERENCES TO RELATED APPLICATIONS

The present invention is a continuation in part of U.S. patent application Ser. No. 10/452,996, entitled "SYSTEMS AND METHODS FOR DISTRIBUTING CONTENT OBJECTS IN A TELECOMMUNICATION SYSTEM," filed Jun. 2, 2003 and assigned to an entity common herewith; U.S. patent application Ser. No. 10/356,364, entitled "PACKET NETWORK INTERFACE DEVICE AND SYSTEMS AND METHODS FOR ITS USE," filed Jan. 31, 2003 and assigned to an entity common herewith; U.S. patent application Ser. No. 10/356,688, entitled "SYSTEMS, METHODS AND APPARATUS FOR PROVIDING A PLURALITY OF TELECOMMUNICATION SERVICES," filed Jan. 31, 2003 and assigned to an entity common herewith; U.S. patent application Ser. No. 10/356, 338, entitled "CONFIGURABLE NETWORK INTERFACE DEVICE AND SYSTEMS AND METHODS FOR ITS USE," filed Jan. 31, 2003 and assigned to an entity common herewith; U.S. patent application Ser. No. 10/367, 596, entitled "SYSTEMS AND METHODS FOR DELIVERING A DATA STREAM TO A VIDEO APPLIANCE," filed Feb. 14, 2003 and assigned to an entity common herewith; and U.S. patent application Ser. No. 10/367,597 entitled "SYSTEMS AND METHODS FOR PROVIDING APPLICATION SERVICES," filed Feb. 14, 2003 and assigned to an entity common herewith. The present application is related to U.S. patent application Ser. No. 10/632, 661 entitled "Systems and Methods for Implementing A Content Object Access Point", and filed by the inventors common hereto and on a date common herewith. The entirety of each of the aforementioned applications is incorporated herein by reference for all purposes.

BACKGROUND OF THE INVENTION

The present invention is related to telecommunication systems. In particular, the present invention is related to access controls in a telecommunication system.

Currently, users are authenticated in a telecommunications system through accessing a central authority and providing a user name and password. Such an approach can involve congestion about the central authority. In some cases, such congestion is unnecessary as the authentication is to be used only in conjunction with relatively localized activities.

Thus, for at least the aforementioned reasons, there exist a need in the art for advanced systems and methods for implementing access controls in relation to a telecommunication network.

BRIEF SUMMARY OF THE INVENTION

The present invention is related to telecommunication systems. In particular, the present invention provides systems and methods for allowing access control to digital assets capable of transfer via a telecommunications system, or other communication system.

Among other things, the present invention provides an authentication system capable of providing authentication services for a plurality of digital assets associated with a customer premises. Such digital assets can include, but are not limited to, customer premises equipment and content objects. Some examples of customer premises equipment include, but are not limited to, personal computers, video recorders, dish antennas, and the like. Content objects can include, but are not limited to, voicemail, email, video, audio, movies, music, games, email, live broadcasts, user preferences, and the like. In different aspects of the present invention, access to digital assets can be provided within a customer premises, between customer premises, and/or between a customer premises and a globally accessible site.

Particular embodiments of the present invention provide an implicit authentication system. Such an implicit authentication system includes a network interface device ("NID") that connects a global communication network to a local communication network. A local authentication authority associated with the NID authenticates one or more customer premises equipment, and a global authentication authority authenticates the NID and by implication the customer premises equipment associated with the NID. Thus, the NID is allowed to vouch for the authenticity of the customer premises equipment eliminating substantial authentication traffic to the global authentication authority.

Various embodiments of the present invention provide methods for authenticating digital assets. Such methods can provide for comparing a user against accessed digital assets to assure compatibility and/or availability. Further, such methods can provide for payment in exchange for distribution of particular digital assets to particular users. Yet further, such methods can provide for controlled remote access to customer premises equipment. Additionally, the methods may rely on implicit authentication as described above.

Some embodiments provide systems for authorizing access to digital assets. Such systems include a global authentication authority that is communicably coupled to a global communication network, and a NID associated with a customer premises that is communicably coupled to the global communication network and to a local communication network. A local authentication authority is associated with the NID, and is operable to authenticate various digital assets maintained in relation to the customer premises. In some cases, the global authentication authority is operable to authenticate the NID, and to implicitly authenticate at least one of the plurality of digital assets maintained in relation to the customer premises. In some cases, authenticating the digital assets maintained in relation to the customer premises involves accessing a digital security device associated with particular digital assets. Such security devices can be a digital certificate or a digital pass. Such authentication can be accomplished using digital security device associated with a digital asset. The local authentication authority and the global authentication authority can issue and store digital security devices, and the network interface device can register and retrieve digital security devices with the local and global authentication authorities. A digital pass allows communication access to digital assets, while a digital certificate allows authorization of content object distribution and/or distribution of content objects obtained from customer premises equipment.

In particular cases, authenticating the NID includes registering the digital security devices at the global authentication authority. The NID is operable to access the digital security devices, and to register the digital security devices with the global authentication authority and/or the local authentication authority. In various cases, the local communication network extends within the customer premises, while the global communication network extends external to the customer premises.

Other embodiments of the present invention provide systems for authorizing access to digital assets that include two or more digital asset sources. At least one of the digital asset sources is communicably coupled to a number of digital assets that are maintained in relation to a customer premises, and to a communication network. Another digital asset source is operable to request a digital asset from the aforementioned digital asset source, and is also communicably coupled to another communication network. Each of the digital asset sources is associated with respective authentication authorities. In particular cases, both digital asset sources are associated with respective customer premises, while in other cases, at least one of the digital asset sources is not associated with a customer premises.

Yet other embodiments of the present invention provide methods for authorizing access to digital assets. Such methods include receiving access information from a NID, based at least in part on the access information, implicitly authenticating a digital asset associated with the network interface device. Such access information can include, but is not limited to, a security device received from either a global authentication authority or local authentication authority. In some cases, the NID is associated with a customer premises, and authenticating the NID includes receiving at least one digital security device associated with a digital asset maintained in relation to the customer premises.

Authenticating the NID can further include registering the various digital security devices associated with respective digital assets. In some cases the digital asset is a content object, while in other cases, the digital asset is a customer premises equipment. Content objects can include, but are not limited to, a recorded audio, a live audio, a live video, a recorded video, an email, a live chat, and a game. Customer premises equipment can include, but is not limited to, a video recorder, an audio recorder, a storage device, a personal computer, a PDA, a mobile telephone, a dish antenna, a television, a refrigerator, and a security equipment. Security equipment can include gate locks, door locks, cameras, and/or the like.

This summary provides only a general outline of some embodiments according to the present invention. Many other objects, features, advantages and other embodiments of the present invention will become more fully apparent from the following detailed description, the appended claims and the accompanying drawings.

BRIEF DESCRIPTION OF THE DRAWINGS

A further understanding of the nature and advantages of the present invention may be realized by reference to the figures which are described in remaining portions of the specification. In the figures, like reference numerals are used throughout several figures to refer to similar components. In some instances, a sub-label consisting of a lower case letter is associated with a reference numeral to denote one of multiple similar components. When reference is made to a reference numeral without specification to an existing sub-label, it is intended to refer to all such multiple similar components.

DETAILED DESCRIPTION OF THE INVENTION

Figure 1:
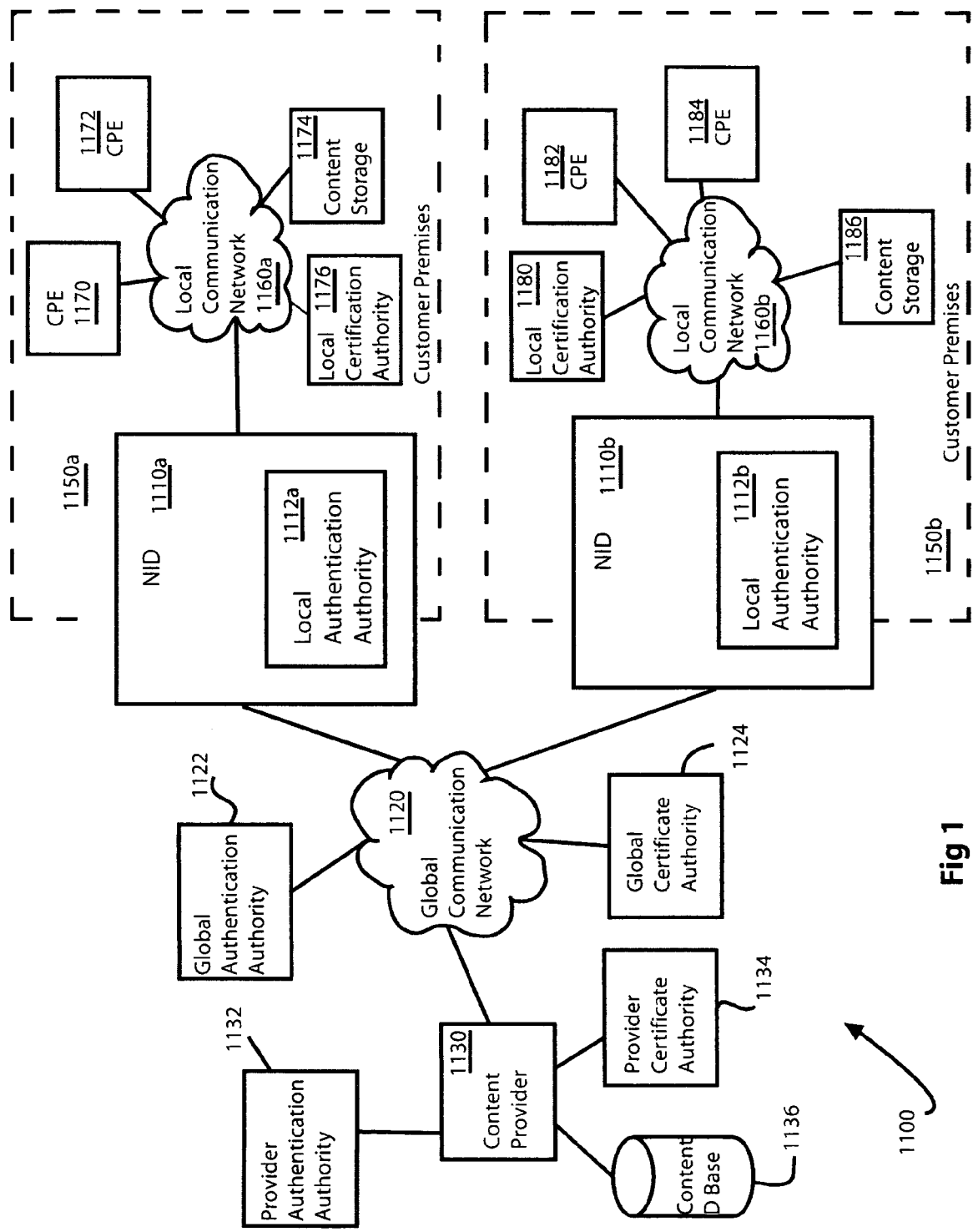
FIG. 1 illustrate a system in accordance with some embodiments of the present invention.

The present invention is related to telecommunication systems. In particular, the present invention provides systems and methods for allowing access control to digital assets capable of transfer and/or providing transfer via a telecommunications system, or other communication system.

Among other things, the present invention provides an authentication system capable of providing authentication services for a plurality of digital assets associated with a customer premises. As used herein, references to "customer premises" are intended to refer to physical structures under the control of a customer through ownership, leasehold, or any other property right. The term is not intended to encompass open real property external to the physical structures, even if such open real property is also under the control of the customer. Such a definition reflects differences in accessibility to the physical structures and surrounding open real property. Access to the physical structures generally requires the presence of the customer or a representative of the customer, while access to the surrounding open real property may be obtained by permission from customer, through an easement, or by other means that does not require the physical presence of the customer. Thus, for example, in the case of a residential customer, the customer premises may correspond to the customer's home, but does not include the yard surrounding the home. Access to the yard may be obtained even when the customer is not home, such as when the customer is at work, is shopping, or is otherwise unavailable to be physically present.

Also as used herein, authentication services can be any communication process whereby a particular entity is determined to be the entity that it claims to be, and/or is determined to have the authority it claims to have. For example, if a laptop computer claims to be device XYZ, the authentication service would determine and confirm that the laptop in question is indeed device XYZ and not another device. As another example, if user ABC claims to have access to device XYZ, the authentication service would determine and confirm that ABC does indeed have authority to access device XYZ. In some cases, the terms validation and security may herein be used interchangeably with authentication.

Particular embodiments of the present invention provide an implicit authentication system. Such an implicit authentication system includes a network interface device ("NID") that connects a global communication network to a local communication network. A local authentication authority associated with the NID authenticates one or more customer premises equipment, and a global authentication authority authenticates the NID and by implication the customer premises equipment associated with the NID. Thus, the NID is allowed to vouch for the authenticity of the customer premises equipment eliminating substantial authentication traffic to the global authentication authority.

Various embodiments of the present invention provide methods for authenticating digital assets. Such methods can provide for comparing a user against accessed digital assets to assure compatibility and/or availability. Further, such methods can provide for payment in exchange for distribution of particular digital assets to particular users. Yet further, such methods can provide for controlled remote access to customer premises equipment. Additionally, the methods may rely on implicit authentication as described above.

Some embodiments of the present invention provide methods for processing digital certificates at a customer premises, and addressing the content objects to specific customer premises equipment, or to a local communication network maintained within the home. Thus, methods in accordance with the present invention can be used for content fulfillment purposes, to make secure payments, and/or the like. In some cases, the digital certificates will be registered with a global certificate authority maintained by a content provider, or implemented as a third party verification service. These digital certificates can then be validated against a certificate authority. In some cases, a hierarchical certificate authority is implemented including local, global, and/or provider certificate authorities.

In some cases, digital certificates are issued for customer premises equipment and for content objects. As used herein, a "content object" is broadly defined to include any group of information that can be accessed via a communication network. Thus, for example, a content object can be, but is not limited to: a pre-recorded digital video segment, a live digital video segment, a pre-recorded digital audio segment, a live digital audio segment, a data file, a voice mail message, a digital picture, and/or the like. "Customer premises equipment" and "CPE" are intended to refer to any device that creates, sends, receives, or otherwise utilizes content objects. Content objects and customer premises equipment are referred to herein collectively as digital assets.

In particular cases, the local certificate authority is implemented in association with a NID. This can include implementing the local certificate authority as part of the NID, or communicably coupled to the NID via a local communication network extending within the customer premises. By providing this functionality to a NID, the authentication services can be accessed across the local communication network, and where it is not required, authentication services do not have to include accessing components associated with networks extending outside of the customer premises. Further, such an approach allows the NID to perform authentication services in relation to digital assets maintained in relation to the customer premises. Thus, when occasion requires authentication on a global communication network, the NID can be authenticated by a global authentication authority, and digital assets previously authenticated by the NID can be implicitly authenticated by the global communication authentication authority. This implicit authentication can include acceptance of the authenticity of the digital assets as affirmed by the NID.

Such authentication can include receiving digital certificates associated with the NID and various digital assets maintained in relation to the customer premises. These digital certificates can then be registered with an appropriate authentication authority, thus allowing for communications at a level designated by the digital certificates to occur. When new digital assets are installed, the NID may automatically update the digital certificates with the various authentication authorities, or await the need to perform such authentication.

In particular cases, a global authentication authority provides a chip or module that can be installed in the NID. This chip or module includes an encoded version of the digital certificate for the NID, and is created such that when the digital certificate is received from the NID, there is a high degree of surety that the NID identified in the digital certificate is authentic. Further, this chip or module is capable of identifying the various digital assets maintained in relation to the customer premises, obtaining digital certificates for each of them from a digital certificate authority, and to associate the identity with the respective digital certificates.

In other cases, the digital certificates are created locally by a local certificate authority, and identify the customer premises where the digital certificate is being created. In such cases, the NID can assure that only content objects with digital certificates matching the customer premises are served onto the global communication network. Alternatively, or in addition, content objects that were received from the global communication network can be queried to determine if they include redistribution rights. Where redistribution rights exist, and the content object has not been modified, the content object can also be served onto the global communication network. This helps to assure that content objects are only used at the destination that paid for them, if that represents the terms under which the content object was obtained. Further, it helps to assure that content objects served from a customer premises include the correct indication of the customer premises, thus lowering the incidence of users introducing malicious content onto the global communication network.

Further, content providers will also be able to register their content objects with a global certificate authority. This can include the provider placing a digital certificate on any content objects distributed by the provider. These digital certificates remain in tact as long as the content object is not in any way modified, or otherwise corrupted. Thus, when a content object is requested by a user, the authenticity of the content object can be tested. This helps to alleviate the occurrence of malicious code or viruses distributed with content.

In some cases, home users have a digital certificate that is assigned to them, and via this digital certificate, they can request services and/or content objects from providers. Using the digital certificate associated with the user, the provider can validate the requests. Where a content object is requested, the content object can come wrapped with a digital certificate indicating the provider and the requestor. Thus access to the provide content object can be limited to the user. Any modification of the digital certificate and/or the content object will damage the content object. As another example, the user's digital certificate may be associated with content objects produced at the customer premises including, for example, emails, voicemails, live camera feeds, and the like. Where this association occurs, access to the content objects may be limited to the user identified in the digital certificate. In some cases, the user's digital certificate is replaced with that of the NID. In such cases, a content object received from a provider may be limited in use by customer premises equipment registered with the NID at the time the content object was requested. It should be noted that not all digital assets will include digital certificates, and content objects may or may not be encrypted whether a digital certificate is used or not. In some cases, the digital certificate is simply used as a digital pass to indicate a requestor.

From the disclosure provided herein, one of ordinary skill in the art will appreciate a myriad of advantages obtainable through using systems and methods in accordance with the present invention. For example, various systems and methods allow for authenticating users and/or services that are trying to make changes to the configuration of the NID, authenticating users and/or services that are trying to deliver content to the customer premises, and authenticating users and/or services that are trying to access digital assets maintained in relation to the customer premises. Other examples of advantages include providing validation for data/configuration request from the customer premises, validation of data/configuration sent to the customer premises, and the like.

Digital certificates can include information useful to uniquely identify a customer premises equipment. Thus, digital certificates may employ a Media Access Control identification (MAC ID). In some cases, the MAC ID is augmented with a serial number of the customer premises equipment, or some other number to render the identification unique. Alternatively, a number can be assigned by the global certificate authority or local certificate authority that is then incorporated with the MAC ID.

A remotely accessible security system provides one example illustrative of various systems and methods in accordance with the present invention. In the example, a customer premises is equipped with a security camera and an electronically controlled lock. In such an application, only certain privileged users can obtain authorization to access images from the camera and/or actuate the electronically controlled lock. Digital certificates can be used to authenticate the lock and camera, and to authorize access to the lock and camera. Other examples that illustrate various systems and methods of the present invention include distribution of content across a communication network where digital certificates are used to authenticate the content and/or the equipment producing the content, and digital passes can be used to authorize access to the content. In some cases, content, digital certificates, and/or digital passes can be encrypted. Encryption can be used protect against 'hackers' who try to steal the digital certificate in order to access digital assets without permission. Such protection can be particularly useful when digital assets are private or sensitive in nature.

Turning to FIG. 1, a system 1100 in accordance with some embodiments of the present intention is illustrated. In system 1100, a global communication network 1120 communicably couples a content provider 1130 and one or more NIDs 1110 associated with respective customer premises 1150. Global communication network 1120 can be any communication network capable of transferring information to/from a site external to customer premises 1150 to/from customer premises 1150. In some cases, global communication network 1120 is the Internet. Based on the disclosure provided herein, one of ordinary skill in the art will appreciate a number of other network types that can be utilized in accordance with embodiments of the present invention. Content provider 1130 can be any source of content objects that are distributable via global communication network 1120. Thus, for example, content provider 1120 can be a telecommunication service provider or a cable television provider. Based on this, one of ordinary skill in the art will recognize other content providers.

Content provider 1130 is associated with a provider authentication authority 1132, a provider certificate authority 1134, and a database 1136 where content objects are maintained. Provider certificate authority 1134 can be responsible for registering digital certificates from approved NIDs, users, and/or digital assets. Further, provider certificate authority 1132 can be responsible for creating and/or assigning digital certificates to content objects maintained on database 1136. In addition, provider certificate authority 1132 can be responsible for requesting a digital certificate from a global certificate authority 1124 as further described below. Provider authentication authority 1132 can be responsible for receiving digital certificates and approving the NID, user, and/or digital asset associated with the digital certificate. Where the digital certificate is approved, the entity associated with the digital certificate is capable of some level of access to content objects maintained on database 1136, or to provide content objects to database 1136.

Global certificate authority 1124 and a global authentication authority 1122 are also communicably coupled to global communication network 1120. Global certificate authority 1124 is a third party digital certificate provider responsible for creating and/or assigning digital certificates to digital assets upon request of a local certificate authority 1176, 1180 or provider certificate authority 1134. Global authentication authority 1122 is a third party authentication service responsible for receiving digital certificates, and approving the NID, user, and/or digital asset associated with the digital certificates.

NIDs 1110 include local authentication authorities 1112 responsible for receiving digital certificates, and approving the NID, user, and/or digital asset associated with the digital certificates. In particular, local authentication authority 1112 is capable of identifying digital assets maintained in relation to customer premises 1150, and assuring that the digital assets are what they claim to be. Further, local authentication authority 1112 can register digital certificates associated with the digital assets, and can represent the digital assets to other entities on global communication network 1120 as having been verified. This will allow for implicit authentication, reducing the amount of authentication being done globally. In addition, where the NID is at least in part controlled by a provider, the security of information passed on global communication network 1120 can be increased.

As illustrated, NIDs 1110 are communicably coupled to respective local communication networks 1160 that extend through the respective customer premises 1150. Local communication networks 1160 can be any type of communication networks or combination of communication networks capable of passing content objects within customer premises 1150. Various CPE 1170, 1172, 1182, 1184 can be communicably coupled to communication networks 1160. Further, a storage device 1176, 1186 that includes one or more content objects can also be communicably coupled to local communication networks 1160. Such storage devices may include hard disk drives associated with a microprocessor for accessing information from the hard disk drive. Each of the aforementioned authentication authorities and certificate providers can be implemented on microprocessor based devices, such as, for example, personal computers, servers, mainframes, imbedded modules, and/or the like.

As will be further appreciated from the discussion below, using the aforementioned system, registration can be provided for various digital assets. This registration can include registering a NID with either the content provider, or with the network itself. Such registration can allow network based services to be accessed throughout the home and network based on digital certificates. Thus, for example, the network internal to the home can rely on locally registered CPE and content objects, while accesses external to a customer premises can rely on global registrations. When a new component is installed such as an attached application to the NID, the component can send its digital certificate via the network to the Certificate Authority database. Further, digital certificates can be temporary, assigned and revoked, or provided on a permanent basis.

In some cases, the digital certificates are maintained with the content object in a common package that can be referred to as a security file structure. A content object can consist of a header with network information, and a packet section. The security file structure is maintained in the data section, and can be interleaved with the data, or appended to the data. The data can in some cases be encrypted, unencrypted, protected, unprotected, or some combination thereof. In one particular embodiment the digital certificate can be an X.509 Protocol. This protocol can include a version or certificate format indication, a unique identifier, a signature algorithm used to sign the certificate, an issuer name or certificate authority name, the identity of the entity to which the certificate is issued, the period of validity of the certificate, and any decryption information.

Various validation processes can be used in relation to the digital certificates. These validation processes can provide for assuring that the proper content objects are transmitted, and that the content objects are provided from safe sources, and that the content objects do not include any malicious code. In addition, the digital certificates can be used to facilitate secure payments and the like.

Figure 2:
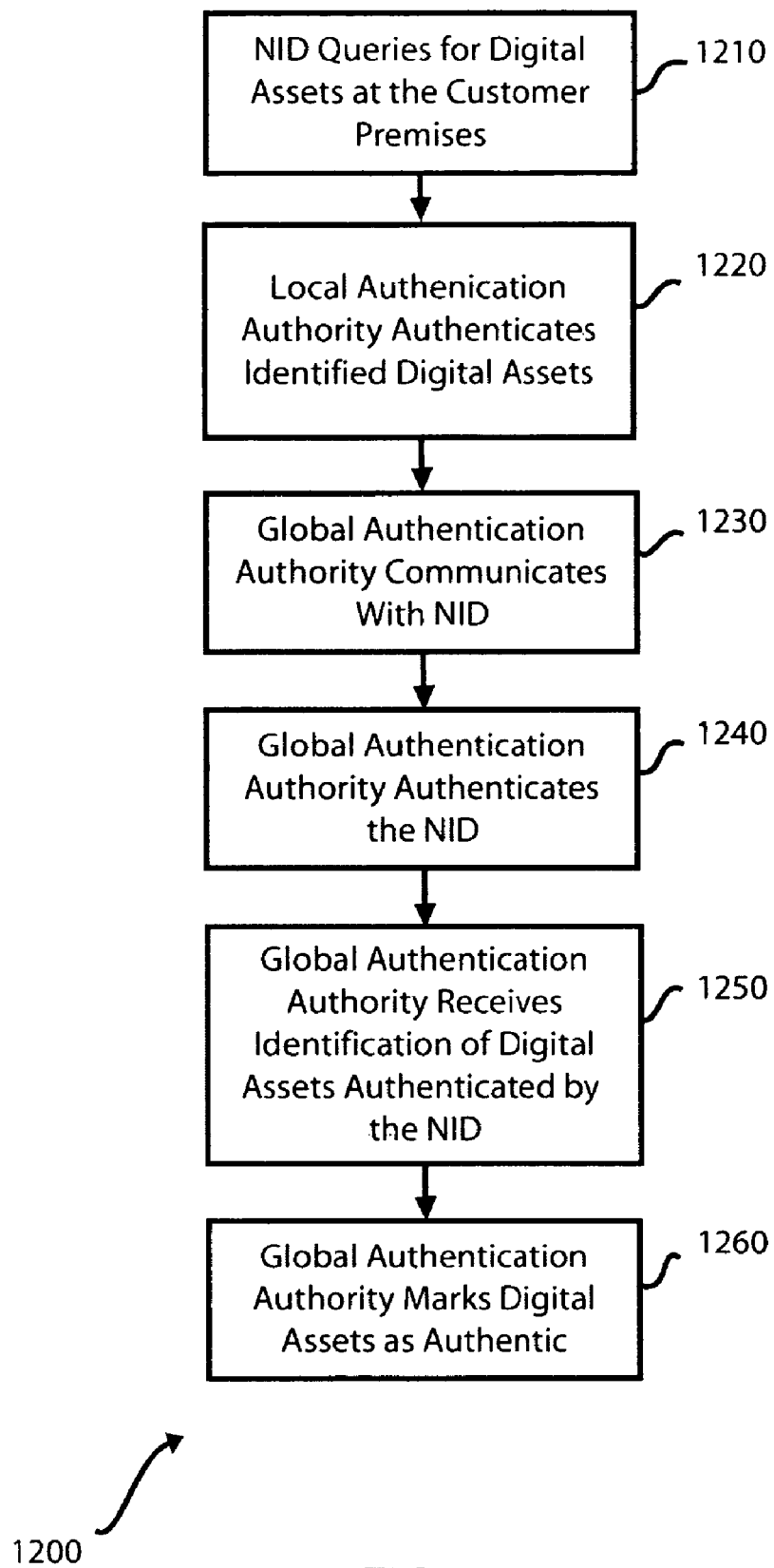
FIG. 2 depicts a detailed portion of the system of FIG. 1.

Turning to FIG. 2, a flow diagram 1200 illustrates a method for implicit authentication in accordance with some embodiments of the present invention. Following flow diagram 1200, a NID or other local authentication device identifies various digital assets including content objects and/or CPE (block 1210). Each of these identified digital assets are then authenticated by the local authentication authority (block 1220). This can include assigning a digital certificate to each of the identified devices, and/or requesting a previously assigned digital certificate from the various devices. Alternatively, it can simply include identifying the device through a MAC ID, or some other identifier. From this, a master list of all devices associated with the customer premises can be assembled in association with the NID. In some cases, a user associated with the customer premises goes through each of the devices on the list and indicates whether the device is approved or not. Thus, in some embodiments, a double authentication is performed.

At some point, the global authentication authority communicates with the NID (block 1230). This can occur where a request is issued by the NID for a content object accessible via the global communication network, or at some other time. This time can be scheduled, or otherwise. During this communication between the NID and the global communication network, the global authentication authority authenticates the NID (block 1240). This authentication can include assuring that a unique identification number associated with the NID, and registered with the global communication network match. Based on this disclosure, one of ordinary skill in the art will appreciate a number of other authentication approaches that can be used in accordance with embodiments of the present invention. For example, when the NID is installed, the installer can register the NID with the global authentication authority. This can include the issuance of a digital certificate for the NID from the global certificate authority. Thus, when an access to the global communication network is provided via the NID, the NID can be authenticated by assuring that the digital certificate received from the NID is the same as that registered with the global authentication authority. This can be an advantage where the NID is installed by a party other than that initiating access requests to the global communication network because the party may be trusted. For example, the party installing the NID may be a third party telecommunications provider, or the same party that maintains the global authentication authority.

In addition, the global authentication authority receives the list of digital assets previously authenticated by the local authentication authority (block 1250). Each device on the list is accepted as authentic, and is from that point authorized to perform functions in relation to the global authentication network consistent with the scope of the authentication (block 1260). Based on the disclosure provided herein, one of ordinary skill in the art will appreciate a variety of hardware and/or software that can be used to implement the method described in relation to FIG. 2.

Figure 3A:
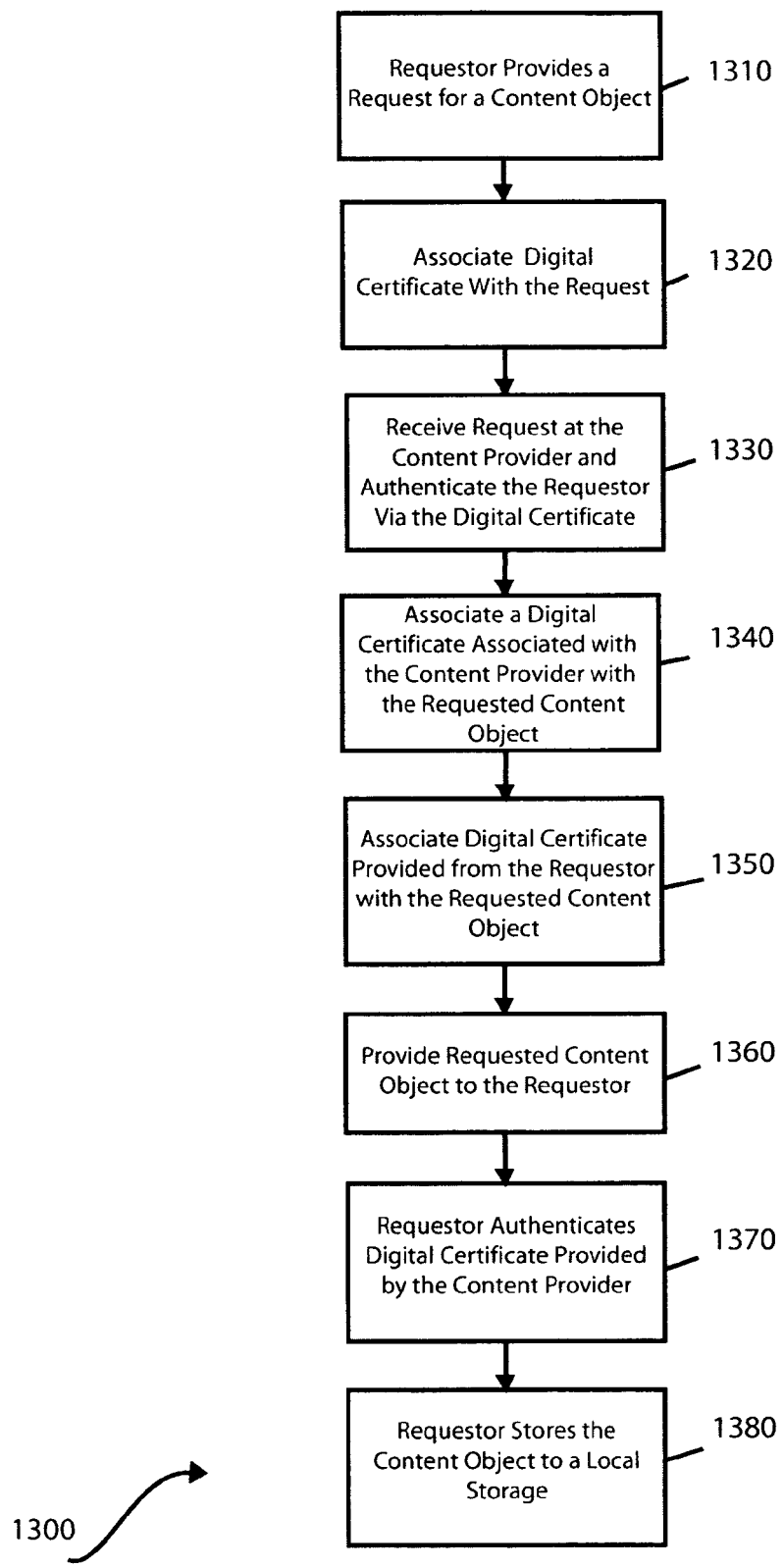
FIG. 3 illustrates a data structure useful in relation to some embodiments of the present invention.

Turning to FIG. 3, other methods for authorizing the transfer of content objects are illustrated in flow diagrams 1300 and 1301. Following flow diagram 1300 of FIG. 3a, a requestor provides a request for a content object (block 1310). Such a request can include, for example, an identification of the desired content object, and an identification of the source of the content object. A digital certificate is associated with the request (block 1320). In some cases, this can be the digital certificate of the device from which the request is issued, a digital certificate associate with the requesting user, and/or a digital certificate associated with a NID through which the request is passed. The request is received by the content provider, and the requestor is authenticated using the digital certificate (block 1330). This authentication can include accessing the global authentication authority, or locally via the provider authentication authority. The content provider then associates the content provider's digital certificate (including a time stamp) with the requested content object (block 1340), along with the digital certificate provided by the requestor (block 1350).

The requested content object including the digital certificates from the requestor and the provider is communicated to the requestor (block 1360). Thus, in some embodiments of the present invention, a content object is distributed with information about both the source and destination of the content object. This an be carried on where the content object is later redistributed to indicate additional sources and destinations. This can be done in such a way that the digital certificates may not be removed from the content object without damaging the content object, or rendering the content object unusable. As just one of many advantages, such an approach can be used to assure that viruses (or other malicious code) are not attached to content objects, and that if a virus is attached, the attachment point can be identified. Further, the source of a copyright infringement can be identified by using such information. Upon receiving the content object, the requestor can authenticate it using the digital certificate associated with the content object provider (block 1370). Once authenticated, the requestor can store the content object to a local storage, or otherwise use the content object (block 1380).

Figure 3B:
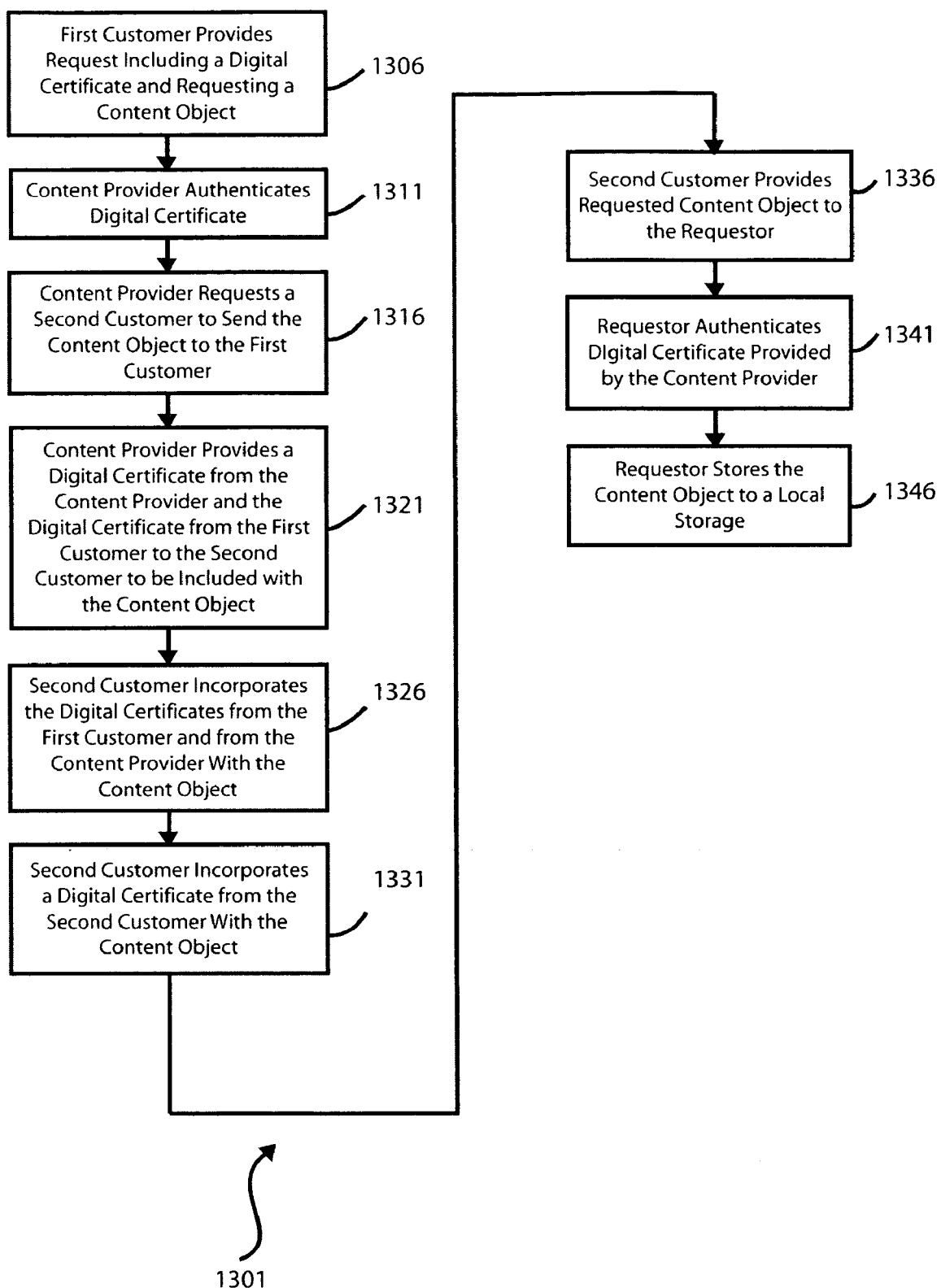

Turning to FIG. 3b, flow diagram 1301 illustrates another method similar to that of flow diagram 1300, except that the content object is transferred by another customer to the requestor. Such content redistribution can be done in accordance with that disclosed in U.S. patent application Ser. No. 10/452,996, entitled "SYSTEMS AND METHODS FOR DISTRIBUTING CONTENT OBJECTS IN A TELECOMMUNICATION SYSTEM," filed Jun. 2, 2003 and assigned to an entity common herewith. The aforementioned patent application was previously incorporated herein by reference for all purposes. Following flow diagram 1301, a first customer requests a content object from a content object provider (block 1305). The request includes a digital certificate which is used by the content object provider to authenticate the request (block 1311). The content provider identifies a second customer that has access to the requested content object, and initiates a request to the second customer asking that the second customer provide the requested content object to the first customer (block 1316). In addition, the content provider provides a digital certificate designating the content provider, along with the digital certificate from the requestor (block 1321). Each of these digital certificates is associated with the requested content object by the NID and/or CPE associated with the second customer (block 1326). In addition, the second customer associates a digital certificate identifying the second customer with the content object (block 1331). The content object is then provided to the first customer by the second customer (block 1336). The first customer can then authenticate the content object using one or both of the digital certificates from the content provider and/or the second customer (block 1341). At this point, the first customer stores the content object, or otherwise uses the content object (block 1346).

Figure 4:
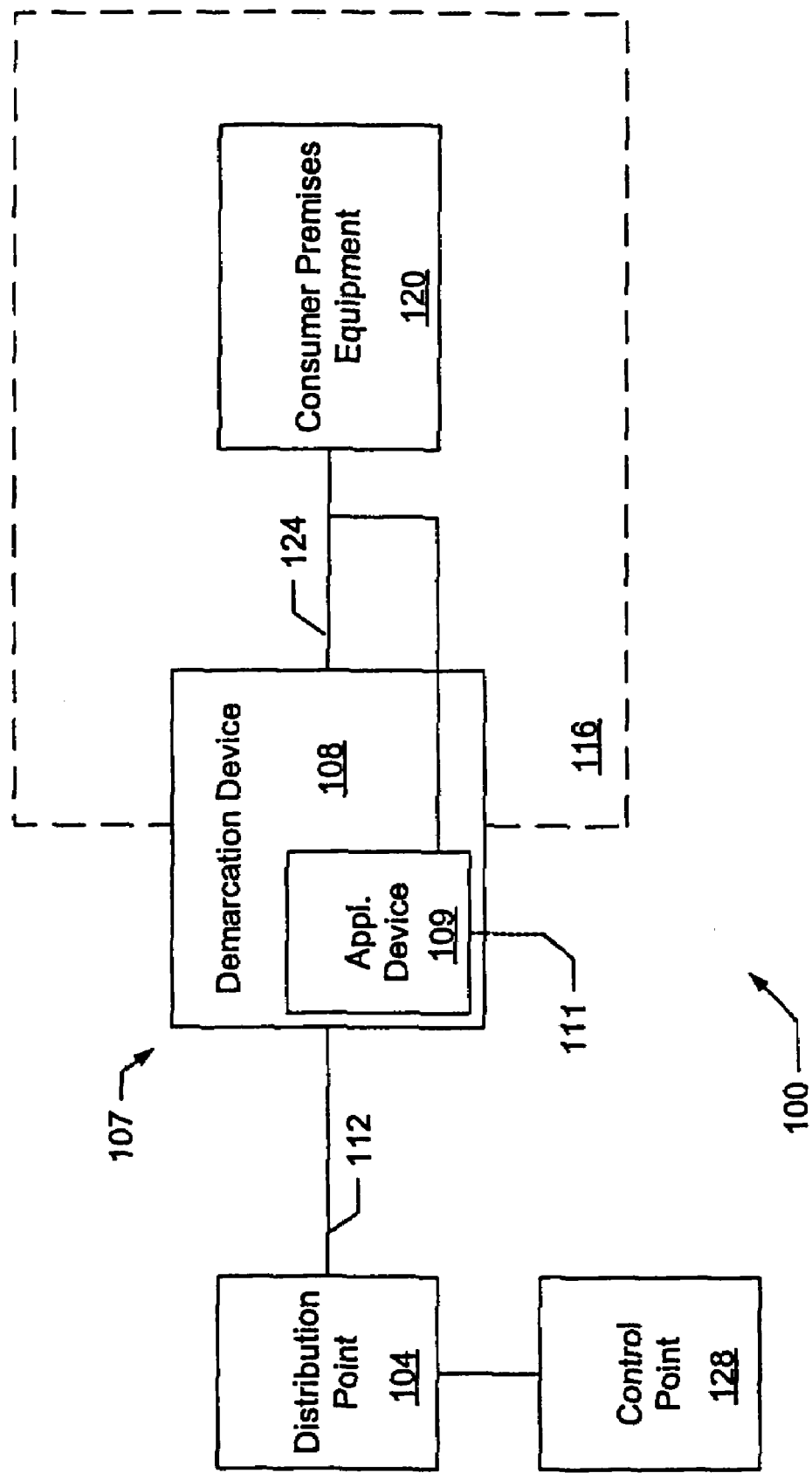
FIGS. 4 and 5 illustrate various demarcation devices and systems associated therewith that can be used in relation to embodiments of the present invention.

Turning to FIG. 4, one example of a system incorporating a demarcation device and/or network interface device ("NID") is described. FIG. 4 and the discussion associated therewith are adapted from the following U.S. Patent Applications that were previously incorporated herein by reference for all purposes: U.S. patent application Ser. No. 10/356,364, entitled "PACKET NETWORK INTERFACE DEVICE AND SYSTEMS AND METHODS FOR ITS USE," filed Jan. 31, 2003 and assigned to an entity common herewith; U.S. patent application Ser. No. 10/356,688, entitled "SYSTEMS, METHODS AND APPARATUS FOR PROVIDING A PLURALITY OF TELECOMMUNICATION SERVICES," filed Jan. 31, 2003 and assigned to an entity common herewith; U.S. patent application Ser. No. 10/356,338, entitled "CONFIGURABLE NETWORK INTERFACE DEVICE AND SYSTEMS AND METHODS FOR ITS USE," filed Jan. 31, 2003 and assigned to an entity common herewith; U.S. patent application Ser. No. 10/367,596, entitled "SYSTEMS AND METHODS FOR DELIVERING A DATA STREAM TO A VIDEO APPLIANCE," filed Feb. 14, 2003 and assigned to an entity common herewith; and U.S. patent application Ser. No. 10/367,597 entitled "SYSTEMS AND METHODS FOR PROVIDING APPLICATION SERVICES," filed Feb. 14, 2003 and assigned to an entity common herewith.

A relatively simple configuration 100 for providing telecommunication services is depicted. Configuration 100 includes a distribution point 104 that can act as a content object origination in communication with a device 108 having demarcation capabilities via an external transport medium 112. In this example, external transport medium 112 comprises a transport medium external to a customer premises 116. Device 108 is shown in FIG. 4 as including an application device 109, which is adapted to interface with an internal transport medium 124. In this example, internal transport medium 124 comprises a transport medium internal to customer premises 116. While application device 109 is shown as part of demarcation device 108, this is not a requirement. In other instances, application device 109 may be distinct from, but coupled with, demarcation device 108, such as by using a modular design with plug-and-play technology.

In one sense, distribution point 104 may be considered to be a content object origination, a source of telecommunication information transmitted to the customer premises, and/or a recipient of content objects or telecommunication information transmitted from the customer premises, however, distribution point 104 need not be either the ultimate source nor the ultimate recipient of telecommunication information and/or content objects. In certain embodiments, distribution point 104 may correspond to a telecommunication service provider's local office. In other embodiments, distribution point 104 may correspond to another network element in the service provider's network, such as a remote termination cabinet and/or a digital subscriber line access multiplier ("DSLAM"). More generally, distribution point 104 may correspond to any facility operated by a telecommunication service provider that is capable of transmitting telecommunication information to, and/or receiving telecommunication information from, a customer premises 116.

Distribution point 104 can be capable of transmitting and/or receiving any type of telecommunication information to/from ANID 107, and such telecommunication information can be organized into a plurality of content objects, as necessary. For ease of description, FIG. 4A does not show any additional sources or recipients of telecommunication information in communication with distribution point 104, but, those skilled in the art will recognize that, in many embodiments, distribution point 104 can be coupled to multiple customer premises 116 (perhaps via an ANID 107 at each customer premises) and often is neither the ultimate source nor the ultimate recipient of telecommunication information. Instead, distribution point 104 can serve as an intermediary between one or more customer premises 116 and one or more telecommunication networks and/or telecommunication information providers, which, as discussed above, can include cable television networks, telephone networks, data networks, and the like. Further, many such networks (as well as, in some embodiments, distribution point 104) can be coupled to the Internet, so that distribution point 104 can serve as a gateway between customer premises 116 and any source and/or recipient of telecommunication information that has a connection to the Internet. The interconnection of telecommunication networks is well known in the art, although it is specifically noted that distribution point 104 can be configured to transmit telecommunication information to (and receive telecommunication information from) virtually any source or recipient of telecommunication information, through either direct or indirect (e.g., through the Internet) communication. Merely by way of example, a distribution point 104 can transmit video signals received from a television programming provider to customer premises equipment, as described in the applications referenced above. In other embodiments, distribution point 104 can be in communication with one or more other customer locations, allowing for private virtual circuits, VLAN tags and wavelengths, or RF connections between customer premises 116 and those locations.

In configuration 100, ANID 107 can serve as the interface between external transport medium 112 and customer premises 116. As shown in FIG. 4, usually both demarcation device 108 and the 109 comprised by ANID 107 are interfaced with the internal transport medium 124, with the demarcation device interfaced with the external transport medium 112, although other interfacing configurations are also within the scope of the invention. For example, application device 109 may additionally be interfaced with the external transport medium 112. The application device may also include a service interface 111 for addressing the application device 109. The service interface 111 may comprise a physical interface, such as a universal serial bus ("USB"), FireWire (IEEE 1394), registered jack 11 ("RJ-11"), registered-jack 13 ("RJ-13"), registered-jack 45 ("RJ-45"), serial, coax, or other physical interface known to those of skill in the art. In other embodiments, the service interface 111 may comprise a logical interface, such as may be provided through a logical connection with an IP address.

As conceptually illustrated in FIG. 4, demarcation device 108 and/or application device 109 may be attached to an external wall of the customer premises 116. Such attachment may be performed of an integrated ANID 107 or may be performed with the components separately of a separated ANID 107. Such a configuration provides many advantages. For instance, if the telecommunication service provider desires to upgrade or otherwise change its network, including, perhaps, external transport medium 112, a technician can perform any necessary changes at demarcation device 108 and/or application device 109 as appropriate without entering the customer premises. Coupled with the ability of some demarcation devices 108 to isolate the telecommunication service provider's network from the customer's premises, this can allow the telecommunication service provider to effect substantial changes in it network without impacting or inconveniencing the customer in any respect. This could, for example, allow the telecommunication service provider to upgrade external transmission medium 112 from a copper twisted pair to optical fiber, without requiring any topological changes inside the customer premises 116. Of course, demarcation device 108 and/or application device 109 may be located at a variety of alternative locations, either within customer premises 116 or at a facility operated by the telecommunication service provider. In addition, as previously noted and as discussed in further detail below, an ANID 107 may also be divided, with different portions situated at different locations, according to the requirements of the implementation.

Application device 109 is configured so that it may communicate with CPE 120, which may be located interior to the customer premises through internal transport medium 124. Such communication is used to implement applications defined by application device 109 with CPE 120 in accordance with telecommunication information received from distribution point 104. In addition, demarcation device 108 may communicate directly with CPE 120 to implement other functions. While the internal transport medium 124 may comprise any of the media discussed above, in one embodiment it comprises existing telephone wiring in customer premises 116 and, in some embodiments, is capable of carrying voice, data and video information. For instance, as described in Edward H. Frank and Jack Holloway, "Connecting the Home with a Phone Line Network Chip Set," *IEEE Micro* (IEEE, March-April, 2000), which is incorporated herein by reference, the Home Phoneline Networking Alliance ("HPNA") standards allow for simultaneous transmission of both voice information and Ethernet frames across twisted-pair copper telephone wiring. In addition to the transmission of telecommunication information through ANID 107, either directly from demarcation device 108 or through the application device 109, telecommunication information may be transmitted via the reverse path to the distribution point 104. Such telecommunication information received at distribution point 104 may be transmitted to an information recipient, such as a service provider. For example, such a transmission may be used to request a pay-per-view movie or the like. Alternatively, telecommunication information received at distribution point 104 may be transmitted across the Internet, such as may be used in the case of sending an email message.

In certain embodiments, ANID 107 can receive state information from a control point 128, which is shown in the illustrated embodiment as associated with distribution point 104. In certain instances, control point 128 can be software and/or hardware operated by a telecommunication service provider for controlling certain features of the operation of ANID 107. For instance, control point 128 can instruct ANID 107 to provide (or cease to provide) particular applications and/or telecommunication services with application device 109 to the customer premises 116. Control point 128 can also provide other directions to ANID 107 through the demarcation device 108, including, for instance, instructions to save or record a particular information set (e.g., data representing a movie), such that the information set may quickly (and, in some cases), repeatedly be transmitted to customer premises 116, allowing the provision of voice, data, video, etc. on demand.

Often, it may be beneficial to allow the customer to provide state information to ANID 107. Thus, in certain embodiments, control point 128 may have a web interface, such that the customer or any authorized person, such as an employee of the telecommunication service provider or telecommunication information provider, may log onto the web interface and configure options for ANID 107, perhaps resulting in state commands being transmitted from distribution point 104 to ANID 107. In other embodiments, control point 128 can be a web interface to ANID 107 itself, allowing the customer or other authorized person to configure ANID 107 directly. In still other embodiments, control point 128 can communicate with ANID 107 through an application programming interface ("API"). Hence, in some embodiments, control point 128 can interface with ANID 107 through an API.

In many such embodiments, the API corresponds to the service interface 111 of the application device. In embodiments where the service interface 111 comprises a logical interface, the API can include a set of software, hardware, or firmware routines or libraries that may be invoked programmatically to configure or relay information to the application device 109. In that sense, then, control point 128 can be understood to be a program running on a computer, perhaps located at distribution point 104 or customer premises 116, among other locations, that provides state information to application device 109 via a software API.

In other embodiments where the service interface 111 comprises a physical interface such as those described above, the API may be accessed locally, such as by a service technician. For example, the service technician could visit property outside the customer premises 116, attach a laptop computer or other device to the physical service interface 111, and upload information to the application device 109, including perhaps both state information, as well as other telecommunication information. In still other embodiments, application device 109 can accept state information through other means, including, for example, through a web interface by receiving a specially formatted electronic message. This is especially the case in embodiments where application device 109 is capable of acting as a web server, as discussed below.

The addressability of application device 109 may be used in various embodiments to change the state of the application device 109. Such state information can include any set of data or other information that may be interpreted by application device 109 as defining operational instructions. This includes, for example, commands to process certain information sets in certain ways, e.g., to provide protocol conversion, to allow transmission of the information set, to deny transmission of the information set, to direct transmission on a particular interface, and the like, as well as commands to provide or cease providing a particular service, such as to provide access to a pay-per-view movie or an additional telephone line. Thus, in certain aspects, a telecommunication service provider can control the application services provided to a customer in several ways. First, the provider can only transmit a telecommunication information set to an ANID 107 if the user of that device is authorized to receive the application service associated with that information set. Alternatively, the service provider could send one or more application services to a customer's ANID 107, and rely on the state of the component application device 109 to prevent unauthorized access to those services.

Those skilled in the art will appreciate that certain control methods are better suited to certain services than to others. For instance, with respect to cable television services, the same set of information may be broadcast to many households, and ANID 107 is well-suited to control access to those services, allowing for greater efficiency in the providing of such services. In contrast, video on demand services may instead be controlled at a distribution point 104 or elsewhere such that a particular ANID 107 only receives video-on-demand information if the customer already has requested and been authorized to receive that service. In such cases, ANID 107 may not need to provide access control functions with respect to that service.

According to some embodiments, ANID 107 can implement either of these access control schemes, or both in combination, as well as others. Moreover, ANID 107 can, in some cases, be configured to support a plurality of schemes transparently. For instance, the customer could request a service from ANID 107, perhaps using one of the methods discussed above, and ANID 107 could relay that request to the appropriate telecommunication service provider and/or telecommunication information provider, as well as reconfigure itself to allow access to that service, if necessary. Of course, ANID 107 can also be configured to take any necessary validating or authenticating action, such as notifying distribution point 104 and/or control point 128 that the service has been requested, and, optionally, receiving a return confirmation that the service has been authorized.

In accordance with other embodiments, state information sent to ANID 107 can include one or more commands to interface with a particular CPE in a certain way. For instance, state information could instruct ANID 107 to turn on and/or off certain lights or equipment, perhaps via additional equipment, or to arm, disarm or otherwise monitor and/or configure a home security system. State information can also include operational data such as an IP address, routing information, and the like, to name but a few examples.

State information can further include instructions to modify one or more security settings of ANID 107. Merely by way of example, in certain embodiments, ANID 107 can include a computer virus scanner, and state information can include updated virus definitions and/or heuristics. Likewise, ANID 107 often will be configured with access controls, such as to prevent unauthorized access through ANID 107 by third parties. State information can include instructions on how to deal with particular third-party attempts to access ANID 107 or internal transport medium 124. Those skilled in the art will recognize as well that some security settings may specify the level of access the customer has to the functions of ANID 107, such as to prevent unauthorized use of certain telecommunication services, and that these settings also may be modified by received state information.

There are a variety of ways in which the various access-control and security functionalities of ANID 107 discussed above may be implemented. In different embodiments, these functionalities may be performed by the demarcation device 108, by the application device 109, by a combination of the demarcation and application devices 108 and 109, and/or by still other components that may additionally be comprised by ANID 107. Moreover, the state information that manages such functionalities may sometimes be sent periodically to ANID 107 to ensure that it is current. Those skilled in the art will also recognize that state information can be considered a subset of the broader category of telecommunication information.

Based on this disclosure, one of ordinary skill in the art will appreciate that a number of demarcation devices, NIDs, and/or encompassing systems can be used to implement the systems and methods in accordance with the present invention. For example, U.S. patent application Ser. No. 10/367, 597 entitled "SYSTEMS AND METHODS FOR PROVIDING APPLICATION SERVICES," describes a number of other examples that could also be used in accordance with the present invention. The aforementioned patent application was previously incorporated by reference for all purposes.

Figure 5A:
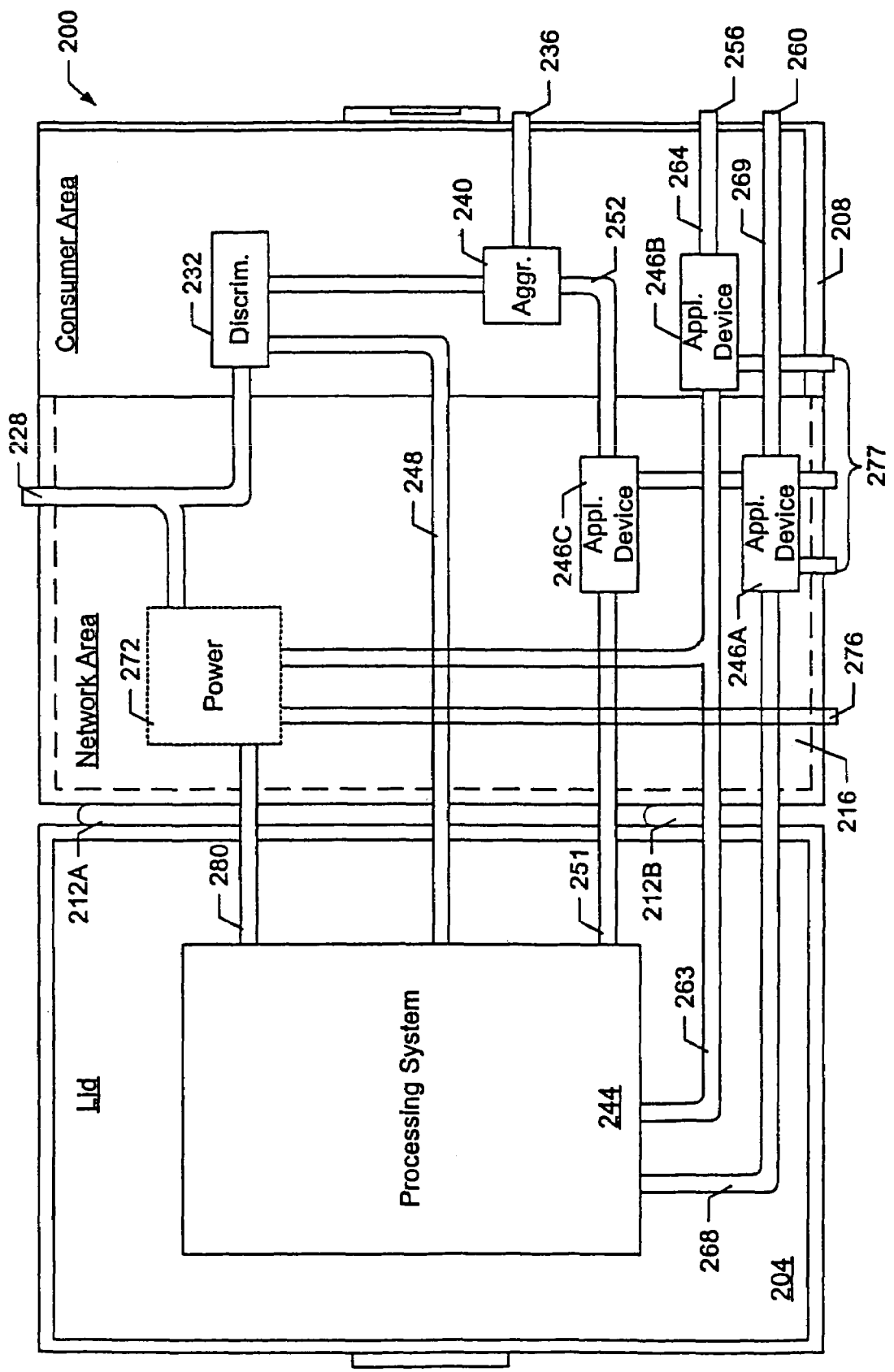
Figure 5B:
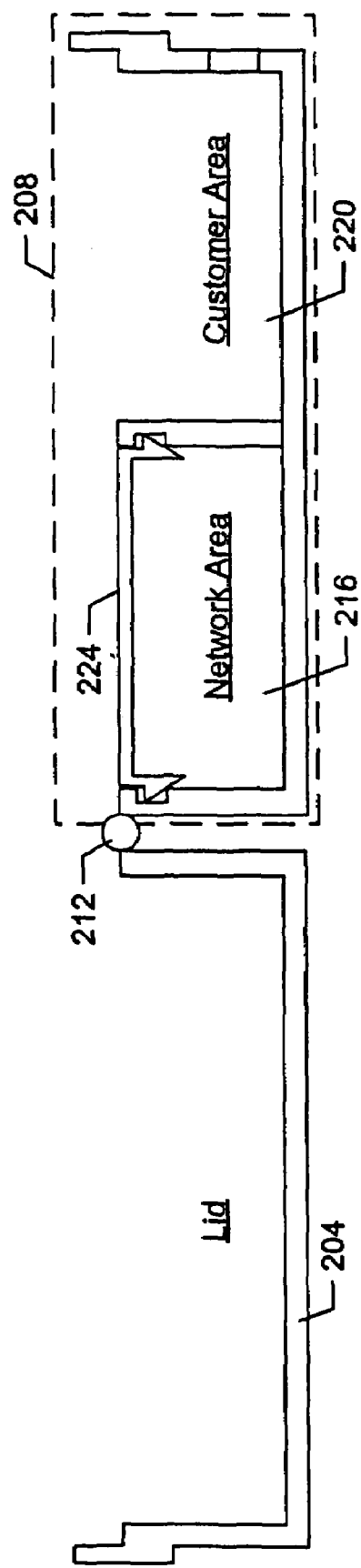
Figure 5C:
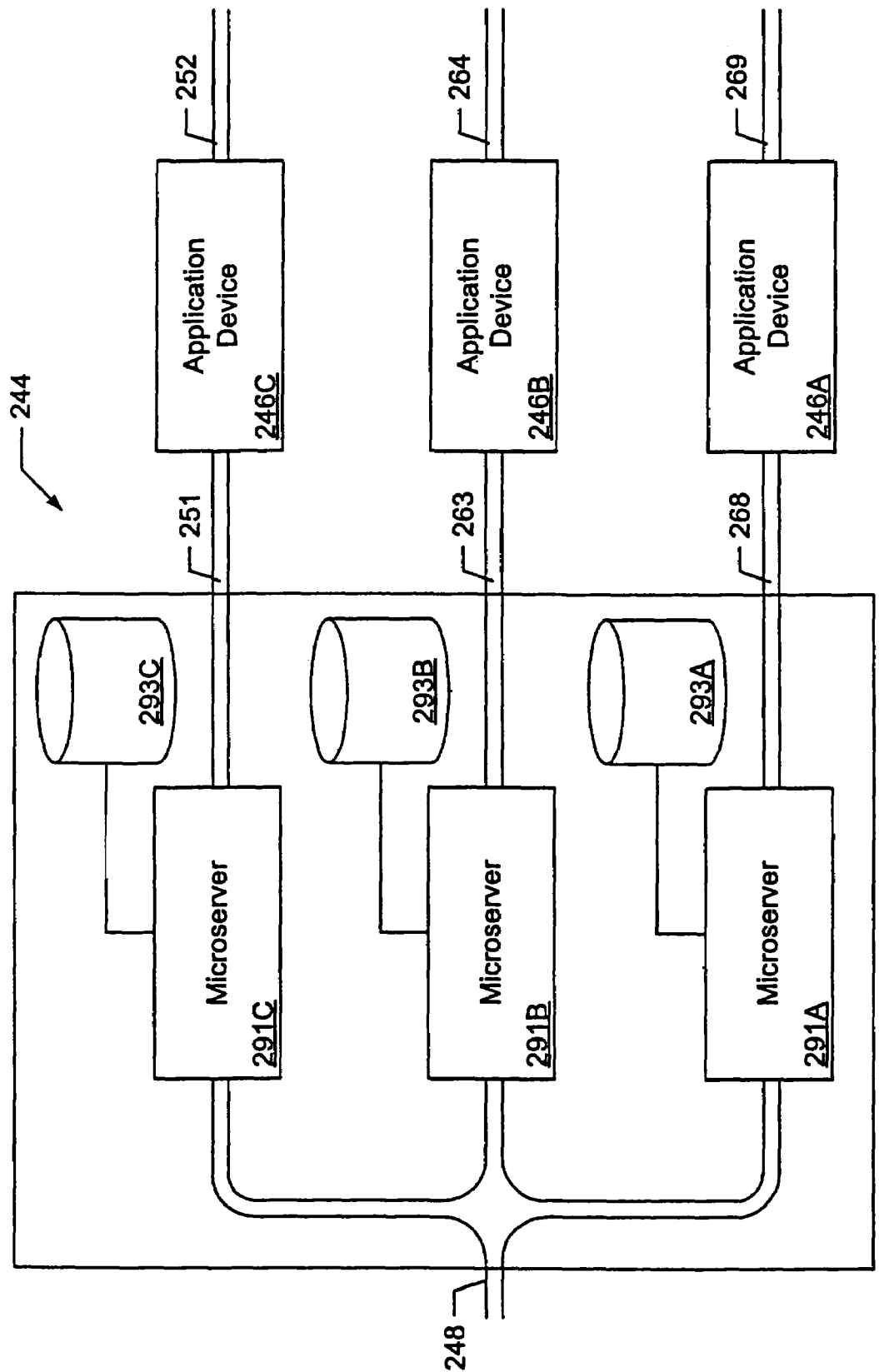
Figure 5D:
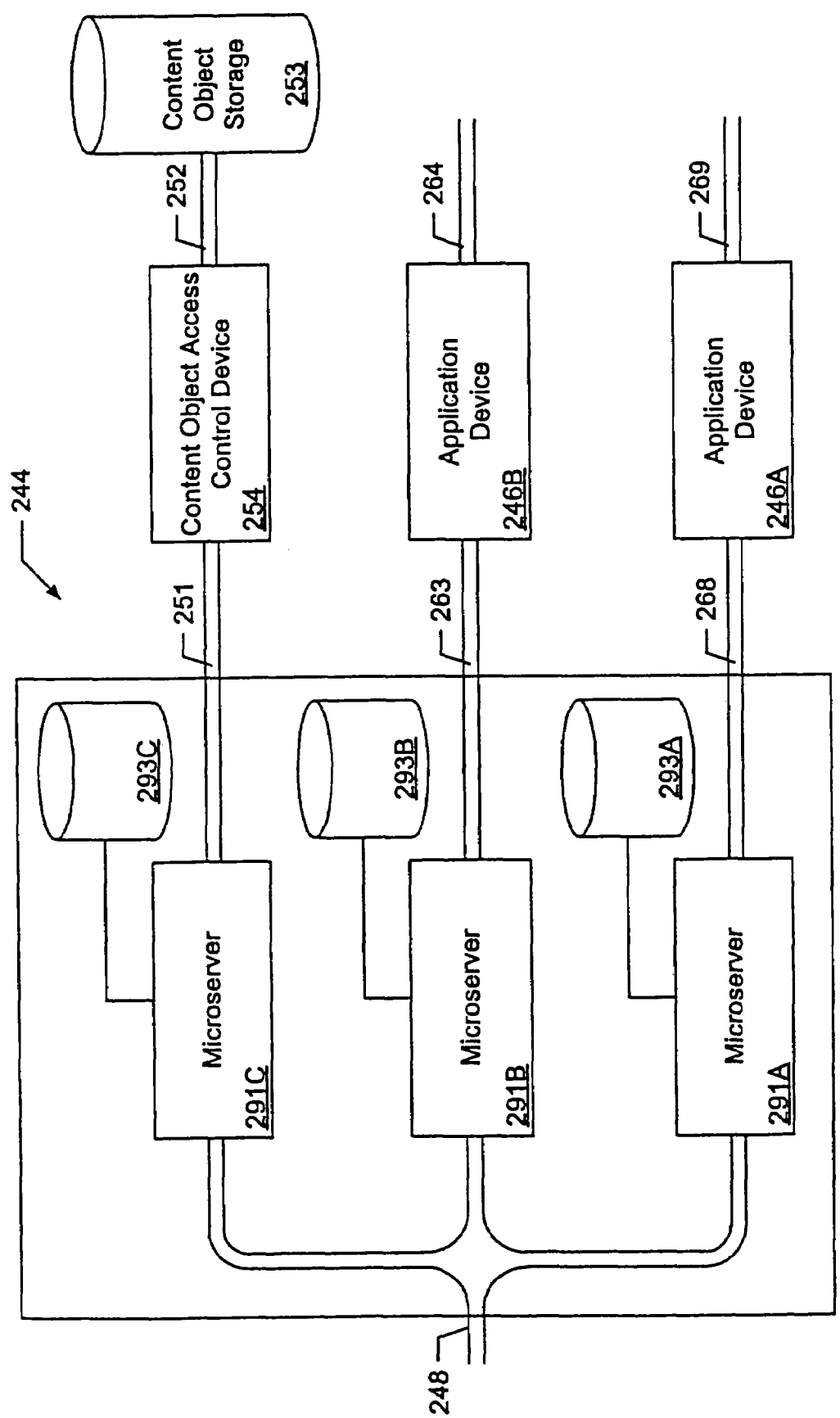

The aforementioned patent application additionally provides disclosure regarding mechanical and electrical characteristics of NIDs useful in relation to the present invention. In relation to FIGS. 5A-5C, a discussion adapted from the aforementioned application is provided. In contrast, FIG. 5D depicts another embodiment of a NID in accordance with some embodiments of the present invention. Turning to FIGS. 5A and 5B, one example of a NID 200 is illustrated. For purposes of illustration, FIG. 5A provides a top view that explicitly shows components within NID 200, while FIG. 5B provides a side view that shows the logical organization of NID 200 without the components. In the illustrated embodiment, NID 200 comprises a clamshell design, with a lid portion 204 and a body portion 208 connected by hinges 212A and 212B. Body portion 208 comprises a network area 216 and a customer area 220. Generally, network area 216 is adapted to receive a cover and is designed generally to be accessible only to personnel authorized by the telecommunication service provider. In contrast, when NID 200 is open, the customer can access customer area 220 to add or remove components as desired. In this and other ways, NID 200 serves to isolate the telecommunication service provider's network from the customer's network, as described above.

NID 200 can include a first interface 228 for communicating with the provider's external transport medium. Those skilled in the art will recognize that, in some embodiments, as described above, the external transport medium may comprise the twisted-pair copper "local loop" running from the customer's premises to the telecommunication service provider's local office, and interface 228 will allow for the attachment of the local loop to NID 200. As discussed above, in other embodiments, the external transport medium can be any of a variety of other media, including satellite transmissions, wireless transmissions, coaxial cable. In fact, in certain embodiments, the external transport medium can comprise multiple transport media (of the same or different types), for which NID 200 could include multiple interfaces. In some such embodiments, NID 200 can function to couple a plurality of external transport media to one another, seamlessly increasing the bandwidth available to the customer premises. For instance, a customer premises might have a satellite link to one telecommunication service provider and an ADSL link to another provider, and NID 200 could combine or multiplex these two links to provide an apparent single, higher-bandwidth to the customer premises. Similarly, those skilled in the art will recognize that in certain of these embodiments, a particular external transport medium, such as a satellite link, may be more well-suited to one way transmission of telecommunication information; in such cases, NID 200 could use a second external transport medium, such as an ADSL link, to allow transmission in the other direction.

Interface 228 can be coupled to a discrimination device 232, which can be operative to separate information sets received on interface 228, and, conversely, aggregate information sets for transmission on interface 22. Merely by way of example, in particular embodiments, discrimination device 232 can separate POTS information from other telecommunication information and/or isolate signals on the internal transport medium from the external transport medium and vice versa. In some embodiments, for instance xDSL implementations, discrimination device 232 can comprise one or more filters. Such filters can include, but are not limited to, high-pass, low-pass, and/or band-pass filters. For instance, in an xDSL implementation, discrimination device 232 might include a high-pass and/or low-pass filter for separating high-frequency (e.g., data) from low frequency (e.g., POTS) information. In other embodiments, discrimination device 232 can comprise many other types of filters, including both digital and analog filters. Discrimination device 232 can be operable to separate information sets through a variety of criteria, including for example, by frequency, by destination device, information type, and/or frequency. Further, in certain embodiments, information sets can be multiplexed (for instance, using various time-division multiplexing or wave-division multiplexing schemes known in the art) for transmission over an external transport medium, and discrimination device 232 can comprise a demultiplexer capable of separating multiplexed signals and, optionally, routing each signal to the necessary destination.

In the illustrated embodiment, discrimination device 232 is in communication with a second interface 236, which can interface with the telephone wires at the customer premises to provide traditional analog telephone service. In some embodiments, an aggregator 240 can be situated between discrimination device 232 and interface 236 to allow additional, perhaps non-POTS, information sets to be sent and received through interface 236 simultaneously with the POTS information. This can include, for example, aggregating information sets for transmission of an HPNA signal over an internal transport medium.

The discrimination device can also be coupled to a processing system 244, which in the illustrated embodiment is located in the lid portion 204, and all non-POTS information sets can be routed to processing system 244 for additional processing. Processing system 244 is described in detail below, but can, in general, comprise one or microprocessors, including digital signal processor ("DSP") chips, memory devices, including both volatile and nonvolatile memories, and storage devices, including hard disk drives, optical drives and other media. In fact, processing system 244 can comprise the equivalent of one or more personal computers, running any of a variety of operating systems, including variants of Microsoft's Windows™ operating system, as well as various flavors of the UNIX™ operating system, including open source implementations such as the several Linux™ and FreeBSD™ operating systems.

Telecommunication information or content objects can be processed by processing system 244 in a variety of ways, including, for example, routing a given content object to a particular interface, transforming information such as by encoding and/or decoding information and converting between different transport protocols, storing information, filtering information, and any of the other functions described herein with respect to processing systems. In certain embodiments, processing system 244 can serve as the termination point for an external transport medium; for instance, processing system 244 can incorporate the functionality of an xDSL modem. In other embodiments, processing system 244 can serve to identify quality-of-service requirements (for instance, latency requirements for voice transmissions and bandwidth requirements for streaming media transmissions, to name a few) and enforce those requirements, ensuring that sufficient bandwidth is provided to a particular device, network segment or application to maintain the quality of service required.

In the illustrated example, processing system 244 is in communication with aggregator 240, which, as discussed above, can aggregate non-POTS information sets received from processing system 244 and POTS information sets received directly from discrimination device 232 for consolidated transmission via interface 236. In effect, discrimination device 232 and aggregator 240, perhaps in conjunction with processing system 244, can function to separate telecommunication information received on interface 228 into a set of POTS telecommunication information and a set of non-POTS telecommunication information. POTS information can be understood to include ordinary telephone signals, (and non-POTS information can be understood to include all other telecommunication information). The non-POTS information is routed via transport medium 248 to processing system 244 for processing, and the POTS information is routed to interface 236 for transmission to the internal transport medium. In certain embodiments, one or more sets of non-POTS information can be routed to interface 236 using transport medium 252 for transmission through interface 236, perhaps in combination with one or more sets of POTS information.

Of course, discrimination device 232 and aggregator 240 can perform the same function in reverse, i.e., to separate and recombine different sets of telecommunication information received on interface 236 from the customer's premises. Thus, in some embodiments, both discrimination device 232 and aggregator 240 each can perform a combined discrimination-device-aggregator function, depending on the direction of information flow. In fact, while termed "discrimination device" and "aggregator" for ease of description, those two devices can actually be identical, and further, their functionality can, in some embodiments, be incorporated into a single device, which could be coupled to interface 228, interface 236, and processing system 244, and could route information sets among any of those three components as necessary. Moreover, as described below, the functionality of discrimination device 232 and/or aggregator 240 can be incorporated into processing system 244; likewise discrimination device 232 can incorporate interface 228 and/or aggregator 240 can incorporate interface 236, such that discrimination device 232 and/or aggregator 240 comprise the necessary components to be coupled directly to the external and internal transport media, respectively.

Discrimination device 232 and/or aggregator 240 can also serve another function in certain embodiments: Since the external transport medium is coupled to first interface 228 and the internal transport medium can be coupled to, inter alia, second interface 236, the discrimination device 232 and/or aggregator 240 can serve as an isolation device for intermediating between the two media, such that when a topological change occurs in one of the media, only the NID interface need be changed, and the other transport medium is not affected. In some such embodiments, discrimination device 232 and/or aggregator 240 can serve to intermediate (including protocol translation and the like) between interfaces 232, 240, allowing either the internal or the external transport medium to be upgraded or changed without impacting the other transport medium. Of course, in certain embodiments, this isolation function also could be performed by processing system 244. In yet other embodiments, the isolation device might comprise a separate piece of hardware in communication with discrimination device 232, aggregator 240 and/or processing system 244.

NID 200 may also comprise one or more application devices 246, which are usually disposed in the network area 216. The application devices are generally provided in communication with the processing system 244 by transport media 251, 263, and/or 268. In some instances, such as illustrated with application devices 246A and 246B, the application devices may be in communication with interfaces 256 and 260 that allow communication with transport media internal to the customer premises, such as over transport media 264 and 269. For example, interface 256 could be a coaxial interface for connection to RG6 and/or RG59 cable, and interface 260 could be an RJ45 and/or RJ11 interface for connection to unshielded twisted pair cable, which can, for instance, form a 10Base-T Ethernet network.

In other instances, such as illustrated with application device 246C, information might be routed from the application device 246C through the aggregator. Such an application may be suitable for applications that use IP data, such as a VoIP application. For example, NID 200 might receive IP data, perhaps combined with other types of telecommunication information, on interface 228. The information set comprising the IP data can be routed by the discrimination device 232 via medium 248 to processing system 244, where it can be processed. Depending on the embodiment, it could then be routed via transport medium 251 to VoIP application device 246C and then provided to the customer's existing telephone wiring using interface 236, optionally in conjunction with aggregator 240 and/or one or more line drivers. It could alternatively be routed to any of the other application devices 246A or 246B depending on their functionality. In this way, the NID can allow virtually unlimited connectivity options for each CPE at the customer premises. Adding to the flexibility of NID 200, the processing system 244 could include components to serve, for example, as a cable or xDSL modem, as well as components to serve as an Ethernet hub, switch, router, or gateway, the functions of each of which are familiar to those of skill in the art.

Furthermore, the application devices 246 may be provided generally within the network area 216 or in the consumer area 208, or with some in the network area 216 and others in the consumer area 208, depending on the embodiment. This is illustrated in FIG. 5A by showing application devices 246A and 246C disposed within the network area 216 of NID 200 and application device 246B disposed within the consumer area 208 of NID 200.

There are a variety of different application devices 246 that can be incorporated within NID 200 in order to provide a versatile range of functionality. The following examples are provided merely by way of illustration and still other application devices that may additionally or alternatively be used will be evident to those of skill in the art after reading this description. One application device 246 that may be included is a digital-recorder application device, which could provide a mechanism for digital recording of all forms of information incoming to NID 200 and make them accessible to a user at the customer premises. The information that could be recorded includes video, data, voice, among other types of information. Another application device 246 that may be included is a digital storage application device, which could provide a supplementary mechanism for storing information presented to user applications. The information that could be stored also includes video, data, voice, and other types of information. The combination of the digital-recorder application device and digital-storage application device in an NID 200 may be used conveniently to provide primary and secondary information-storage capabilities. For example, the digital-recorder application could be used to provide a primary, on-line, video storage capability while the digital-storage application could be used to provide a secondary, off-line, video storage capability. Still other application devices could be included to enhance such functionality further. For example, hard-drive application device could be provided to permit expandable storage capabilities.

Other examples of application devices 246 whose functions may be conveniently coordinated include digital-asset application devices. For example, one of application devices 246 in NID 200 could comprise a digital-asset sharing application device to permit sharing of information among equipment within the customer premises. Such an asset-sharing capability may be used within the customer premises to share video, data, electronic books, games, music, and the like. Another of application devices 246 could comprise a digital-asset caching application device to permit storage and distribution of digital assets. The combination of digital-asset sharing application devices and digital-asset caching application devices among a plurality of NIDs 200 in a service are could then be used to permit exchange of video, data, electronic books, games, music, and the like among customer premises throughout a defined service area. In some instances, a further application device 246 could comprise a digital-asset protection application device to control the distribution of digital assets in accordance with legal restrictions, such as those derived from copyright ownership.

In some embodiments, the application devices 246 may comprise application devices for effecting various voice-related applications within a customer premises. For example, a voice application device could include functionality to provide such functions as telephone caller identification, call logs, voice mail-storage, voice-mail retrieval, call waiting, solicitation barriers, and the like. In addition, a VoIP application device could provide support for VoIP functions within the customer premises.

Still other application devices 246 that may be used include various types of informational applications. For example, an online digital guide application device could be used to provide a digital data guide for television, music, and other types of programming. Such a data guide could be provided alternatively in real time or in non-real-time. A further example of an informational application could be realized with a home-utilities application device adapted to provide monitoring and/or billing tracking functions for utilities used within the customer premises. In this way, the use and/or cost of electricity, gas, water, and other utilities may be monitored by the customer. In addition, a diagnostic-interface application device may be provided to permit diagnostic functions of equipment within the customer premises, thereby permitting the customer to obtain information on the functioning of such equipment.

Other application devices 246 may provide security functions. For example, a data security application device may be used to provide hacker protection for the home, responding to identified attempts to breach the security of the customer premises. In addition, a home-security application device could be provided to monitor the physical security of the customer premises. Such a home-security application device would typically be provided with an interface to door and window monitors to determine whether they are open or shut, and with an interface to motion detectors, glass-breaking detectors, and other physical security equipment known to those of skill in the art.

Application devices 246 may also be provided to permit various types of data-conversion functions to be used by the customer premises. For example, a digital-information-conversion application device may be provided to convert digital information incoming to NID 200 to be converted to other sources for use by CPE in the customer premises. Thus, incoming digital information could be converted to analog information for use by analog equipment, such as an analog television. Similarly, incoming broadcast video could be converted for transmission to a PDA, and the like. Similarly, a wireless application device could be used to provide a wireless interface to the customer premises for data, video, and other types of information. Merely by way of example, if interface 228 receives telecommunication information that includes digitally encoded video signals, such as MPEG-2 data, the information set that includes the encoded video signals can be routed by discrimination device 232 to processing system 244. After transmission from the processing system to the information-conversion application device over transport medium 263, the signals can be decoded into RF-modulated NTSC, HDTV, PAL and/or SECAM format for transmission via transport medium 264 to coaxial interface 256, where it can be transmitted via coaxial cable to one or more televisions at the customer premises. Alternatively, if the customer has a digital set-top box located at the television, the encoded signals can be routed by to aggregator 240, where the signals can be transferred through interface 236 to the set-top box for decoding. The ability of NID 200 to support multiple interfaces of different types thus allows great flexibility in routing telecommunication information throughout the customer premises.

Each of the application devices 246 in the NID may include a service interface 277 to permit states of the application devices 246 to be changed and/or updated. As previously notes, such interfaces may comprise physical interfaces such as USB, FireWire (IEEE 1394), RJ-11, RJ-45, serial, coaxial, or other physical interfaces, to permit a service technician to interact with the application devices 246 while at the site of NID 200. Alternatively, the service interfaces may comprise logical interfaces to permit IP addressing to be used in changing the state of the application devices. In many instances, NID 200 may also include a future-application device with open architecture to support new applications. The architecture may be configured by use of the service interfaces 277 when the new application is implemented.

In certain embodiments, NID 200 can comprise a line driver (not shown on FIG. 5A or 5B), coupled to processing system 244 and aggregator 240. The line driver can function to allow conversion between various network formats and media, allowing a variety of different media types, e.g., twisted pair and/or coaxial cable, in accordance with the HPNA and HPNA+ standards, as well, perhaps, as the customer premises' A/C wiring, in accordance, for example, with the HomePlug™ standard, to transport combined POTS and non-POTS information sets.

In certain embodiments, NID 200 can comprise a power supply 272 for providing electrical power to the components in NID 200. Power supply 272 can be powered through electrical current carried on the external transport medium and received on interface 228. Alternatively, power supply can receive electrical current from a coaxial interface, such as interface 256, or through a dedicated transformer plugged into an AC outlet at customer premises, e.g., through 12V connection 276. Processing system 244 can be powered by a connection 280 to power supply 272, or through one or more separate power sources, including perhaps the A/C power of the customer premises. In some embodiments, processing system 244 might have its own power supply.

As mentioned above, processing system 244 can comprise a plurality of processing devices, and each processing device can comprise multiple components, including microservers, memory devices, storage devices and the like. As used herein, a "microserver" is intended to refer to any device programmed to perform a specified limited set of functions, such as an EPROM. Merely by way of example, FIG. 5C provides a detailed illustration of an exemplary processing system 244, which comprises multiple processing devices 291. In accordance with the exemplified embodiment, transport medium 248 links processing system 244 with an external transport medium, perhaps via a discrimination device and/or interface, as described above.

Transport medium 248 can be coupled to a plurality of microservers 291 such that any information received by the processing system 244 via transport medium 248 may be routed to any of the microservers 291. Each microserver can, in some embodiments, be the equivalent of a server computer, complete with memory devices, storage devices, and the like, each of which is known in the art. In FIG. 5C, storage devices 293 associated with each of the microservers 291 are shown. Each of the microservers may be associated with one of the application devices 246 to provide information received from transport medium 248 and specifically processed for use by the corresponding device. Thus, the microservers 291 may individually be adapted to function as, for example, HTML microservers, authentication microservers, FTP microservers, TFTP microservers, DHCP microservers, WebServer microservers, email microservers, critical alert microservers, home-security microservers, VPN microservers, advertising microservers, instant-messaging microservers, wireless microservers, RF microservers, test-access microservers, data-security microservers, and the like.

In addition to these functions, microservers 291 can be configured to route information sets received via transport medium 248, according to the type of telecommunication information in the set (e.g., encoded video, IP data, etc.) as well as any addressing information associated with either the set or the information it comprises (e.g., a specified destination port or network address for a particular subset of telecommunication information). In this way, microservers 291 can serve switching functions somewhat similar to that described with respect to discrimination device 232 described in relation to FIG. 5A. For instance, if IP data is received by microserver 291A, such data can be routed to an Ethernet connection, to the existing telephone wiring, e.g., in an HPNA implementation, or to any other appropriate medium, perhaps via an appropriate line driver. In fact, in certain embodiments, processing system 244, and in particular one or more of microservers 291, can incorporate the functionality of discrimination device 232 and/or aggregator 240, rendering those components optional. In some embodiments, one or more of the microservers may be adapted to function as a controller for NID 200, overseeing the NID's state and monitoring performance. In some embodiments, the controller functions can be accessed using a web browser.

Processing system 244 can have multiple means of input and output. Merely by way of example, microservers 296 can communicate with one or more external transport media (perhaps, as discussed above, via intermediary devices) using one or more transport media (e.g., 248). Processing system 244 also can communicate with one or more internal transport media via a variety of information conduits, such as category 5, 5e and/or 6 unshielded twisted pair wire 268, RG6 and/or RG59 coaxial cable 264, and category 3 unshielded twisted pair copper (telephone) wire 252, again possibly via intermediary devices, as discussed with reference to FIG. 5A. Notably, some embodiments of processing system 244 can include interfaces for multiple transport media of a particular type, for instance, if processing system 244 serves as a networking hub, switch or router. Processing system 244 can also have infra-red and radio-frequency receivers and transmitters, for instance to allow use of a remote control device, as well as wireless transceivers, for instance to allow wireless (e.g., IEEE 802.11) networking.

FIG. 5D illustrates one example of processing system 244 of NID 200 in accordance with some embodiments of the present invention where one of microservers 291 is associated with a content object access control device 254. Content object access control device 254 can be any hardware and/or software module that can provide access to content objects maintained on a content object storage 253, or via some other content object device (not shown). In some cases, content object storage is the same as local storage 1132 as previously described. Similarly, in some cases, content object access control device 254 can include hardware and/or software to perform the functions described in relation to local control 1131 above, and to implement the various other content object access routines described herein. Content object storage 253 can be any type of storage device capable of maintaining and/or accessing content objects. Thus, for example, content object storage 253 can be a hard disk drive, a CD-ROM drive, a DVD drive, a personal computer, and/or the like. In some cases, at least a portion of content object storage is installed in NID 200 with other portions installed external to NID 200. In other embodiments, all of content object storage 253 is installed in NID 200, while in yet other embodiments, none of content object storage 253 is installed in NID 200. Based on the disclosure provided herein, one of ordinary skill in the art will understand various methods can be used to communicably couple content object storage 253 with NID 200, and to provide access control to/from content object storage 253 via content object access control device 254.

By incorporating content object storage 253 with NID 200, access to content objects and serving content objects can be provided via the customer premises. This can include access to the content objects by a user at the customer premises, or by others external to the customer premises that are communicably coupled to the customer premises. Thus, for example, a live camera may be placed in communication with content object access control device 254. In this way, video information from the camera can be accessed by other users via the NID, or by users at the customer premises via the same NID. Alternatively, or in addition, a variety of content objects can be maintained on content object storage 253, and also served to other users and/or utilized by users at the customer premises. Content object storage 253 can store content objects that are produced at the customer premise, or that are downloaded from some content object origination.

In some embodiments, a separate interface is provided for storing content objects to one or more offline media. As used herein, offline media is any media that must be installed in an online device to be accessed. Thus, for example, offline media can include, but is not limited to, CD-ROMs, DVDs, Flash Cards, floppy disks, tape disks, and/or external drives. In some cases, content objects maintained on content object storage 253 is written on a track-by-track and sector-by-sector basis. In some cases, the information maintained on content object storage 253 is in encrypted format, and is decrypted by an application operating on the NID. In other cases, the information is received in encrypted format and is decrypted by the NID prior to storage on content object storage 253.

In particular embodiments, a section of content object storage 253 is apportioned to accept firmware updates and/or other updates. In such cases, such updates can be written to the portion of content object storage 253 installed as part of the NID. It should be noted that such an approach provides for scalability where multiple hard drives, or other storage elements can be added to existing storage elements forming content object storage 253.

Figure 6:
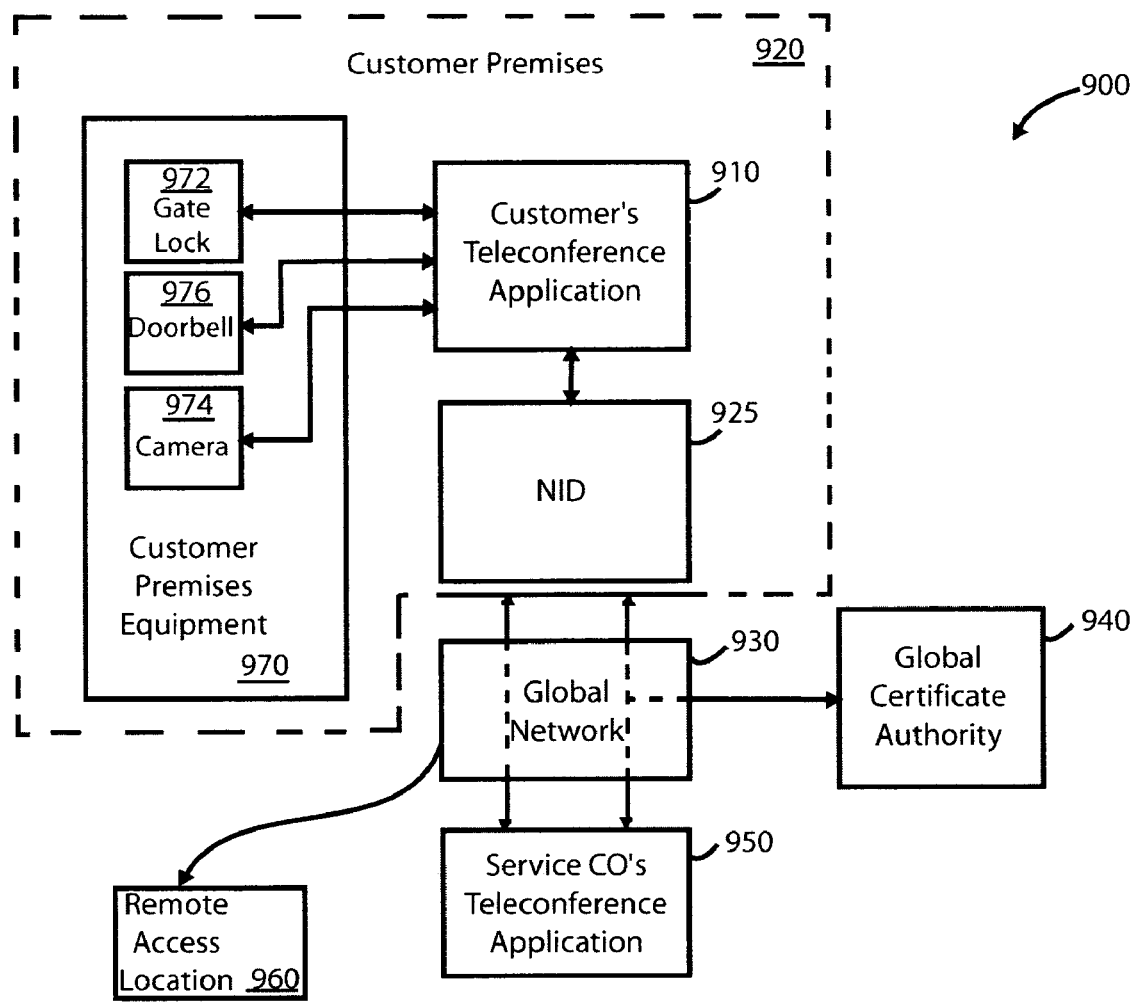
FIGS. 6-7 illustrate various methods in accordance with embodiments of the present invention.
Figure 7:
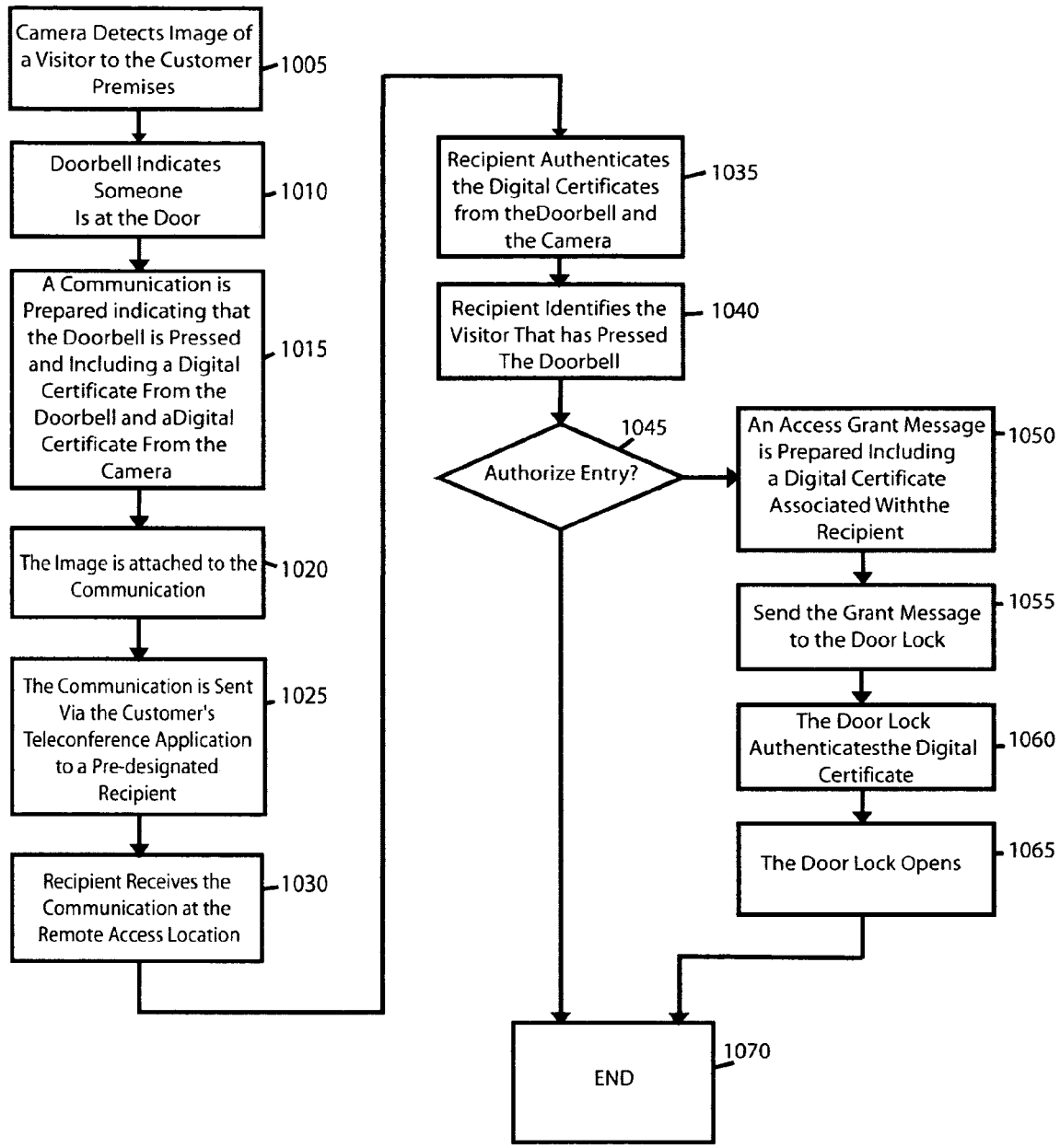

Turning to FIGS. 6 and 7, one example of a remote door lock utilizing various systems and methods of the present invention is illustrated. A system 900 includes a global certificate authority 940, a remote access location 960, and a service company's teleconference application 950 each communicably coupled to a NID 925 via a global communication network 930. NID 925 is associated with a customer premises 920, and customer premises 920 includes one or more customer premises equipment 970 including a gate lock 972, a camera 974, and a doorbell 976. Camera 974 and gate lock 972 communicate with NID 925 via a teleconference application 910.

Turning to FIG. 7, a flow diagram 1000 illustrates a method in accordance with one embodiment of the present invention, and using the hardware described in relation to FIG. 6 to provide remote access to a customer's premises. Following flow diagram 1000, a visitor approaches customer premises 920 and an image of the visitor is detected by camera 974 (block 1005). The visitor depresses doorbell 976 (block 1010), and in response a communication is prepared indicating that the doorbell has been actuated (block 1015). This communication includes a digital certificate from the doorbell and a digital certificate from the camera. The image captured by the camera is attached to the communication (block 1020), and the communication including the digital certificates and the image is transferred to a pre-designated recipient (block 1025). The pre-designated recipient can be the owner of customer premises 920, or some other person, entity, or machine authorized to grant access to the premises. The recipient receives the communication at a remote location (block 1030), and authenticates the digital certificates from one or both of the doorbell and the camera (block 1035). Thus, the recipient can know that the image of the visitor being viewed is from the camera at the customer premises, and that the request to access the customer premises is being initiated via the doorbell at the customer premises. The recipient (which could be a machine in particular cases) can then use the verified image to identify the visitor and make a determination about whether to allow the visitor access to the customer premises (block 1040). Where the visitor is not to be allowed access (block 1045), the process ends in the same way that a failure to respond to a doorbell would end (block 1070).

Alternatively, where the recipient decides to grant access (block 1045), an access grant message can be prepared that includes a digital certificate associated with the recipient (block 1050). This access grant message can then be communicated to gate lock 972 (block 1055), which in turn authenticates the digital certificate of the recipient (block 1060). Where the certificate is properly authenticated, the gate is unlocked (block 1065).

The invention has now been described in detail for purposes of clarity and understanding. However, it will be appreciated that certain changes and modifications may be practiced within the scope of the appended claims. Accordingly, it should be recognized that many other systems, functions, methods, and combinations thereof are possible in accordance with the present invention. Thus, although the invention is described with reference to specific embodiments and figures thereof, the embodiments and figures are merely illustrative, and not limiting of the invention. Rather, the scope of the invention is to be determined solely by the appended claims.

What is claimed is:

1. A system for authorizing access to digital assets, the system comprising:
    a global authentication authority, wherein the global authentication authority is communicably coupled to a global communication network;
    a first network interface device associated with a customer premises, wherein the first network interface device is communicably coupled to the global communication network and to a first local communication network;
    a second network interface device associated with a customer premises, wherein the second network interface device is coupled to the global communication network and to a second local communication network,
    a first local authentication authority associated with the first network interface device, wherein the first local authentication authority is operable to authenticate a plurality of first digital assets maintained in relation to the customer premises, and communicably coupled to the first local communication network, and
    a second local authentication authority associated with the second network interface device, wherein the second local authentication authority is operable to authenticate a plurality of second digital assets maintained in relation to the customer premises, and communicably coupled to the second local communication network,
    wherein the global communication network communicably couples the first local communication network and the second local communication network.

2. The system of claim 1 wherein the global authentication authority is operable to authenticate the first and second network interface devices, and to implicitly authenticate at least one of the plurality of first and second digital assets maintained in relation to the customer premises.

3. The system of claim 2 wherein implicitly authenticating at least one of the plurality of first and second digital assets maintained in relation to the customer premises includes accessing a digital security device associated with at least one of the plurality of first and second digital assets maintained in relation to the customer premises.

4. The system of claim 3, wherein authenticating the first network interface device includes registering the at least one first digital security device associated with at least one of the first plurality of digital assets maintained in relation to the customer premises.

5. The system of claim 3, wherein at least one of the global authentication authority, the first local authentication authority, and the second local authentication authority is operable to issue and store at least one digital security device.

6. The system of claim 3, wherein the first network interface device is further operable to access the at least one first digital security device from at least one of the plurality of first digital assets maintained in relation to the customer premises, and to register the at least one first digital security device in relation to at least one of: the global authentication authority and the first local authentication authority.

7. The system of claim 3, wherein the first or second digital security device is a digital certificate.

8. The system of claim 3, wherein the first or second digital security device is a digital pass.

9. The system of claim 1, wherein the first or second local communication network extends within the customer premises, and wherein the global communication network extends external to the customer premises.

10. The system of claim 1, wherein the first or second digital assets are selected from a group consisting of: content objects and customer premises equipment.

11. The system of claim 10, wherein the content objects are selected from a group consisting of: recorded audio, recorded live audio, live video, email, live chat, live voice, voicemail, and games.

12. The system of claim 10, wherein the customer premises equipment is selected from a group consisting of: video recorder, audio recorder, storage device, personal computer, PDA, mobile telephone, dish antenna, television, refrigerator, and security equipment.

13. A system for authorizing access to digital assets, the system comprising:
    a first digital asset source, wherein the first digital asset source is communicably coupled to a plurality of digital assets maintained in relation to a customer premises, and wherein the first digital asset source is communicably coupled to a first communication network;
    a first authentication authority associated with the first digital asset source;
    a second digital asset source operable to request a digital asset from the first digital asset source, wherein the second digital asset source is communicably coupled to a second communication network;
    a second authentication authority associated with the second digital asset source, and
    a global communication network that communicably couples the first communication network and the second communication network,
    wherein the system further comprises a network interface device associated with the first digital asset source,
    wherein the first communication network is a local communication network,
    wherein the first network interface device is communicably coupled to the first communication network and to the global communication network,
    wherein the first authentication authority is a first local authentication authority associated with the first network interface device,
    wherein the first local authentication authority is operable to authenticate a plurality of digital assets maintained in relation to the first digital asset source,
    wherein the system further comprises a second network interface device associated with the second digital asset source, wherein the second communication network is a local communication network, wherein the second network interface device is communicably coupled to the second communication network and to the global communication network, wherein the second authentication authority is a second local authentication authority associated with the second network interface device, wherein the second local authentication authority is operable to authenticate a plurality of digital assets maintained in relation to the second digital asset source.

14. The system of claim 13, wherein the customer premises is a first customer premises, and wherein the second digital asset source is maintained in relation to a second customer premises.

15. A method for authorizing access to digital assets, the method comprising:

receiving first access information from a first network interface device coupled to a first local communication network;

based at least in part on the first access information, implicitly authenticating a first digital asset associated with the first network interface devices;

receiving second access information from a second network interface device coupled to a second local communication network;

based at least in part on the second access information, implicitly authenticating a second digital asset associated with the second network interface device; and communicably coupling the first communication network and the second communication network with a global communication network.

16. The method of claim 15, wherein the first and second access information includes a security device received from a one of: a global authentication authority, a first local authentication authority, and a second local authentication authority.

17. The method of claim 15, wherein the first network interface device is associated with a first customer premises, and wherein authenticating the first network interface device includes receiving at least one first digital security device associated with a first digital asset maintained in relation to the first customer premises and the second network interface device is associated with a second customer premises, and wherein authenticating the second network interface device includes receiving at least one second digital security device associated with a second digital asset maintained in relation to the second customer premises.

18. The method of claim 17, wherein authenticating the first network interface device further includes registering the at least one first digital security device associated with the first digital asset maintained in relation to the first customer premises and authenticating the second network interface device further includes registering the at least one second digital security device associated with the second digital asset maintained in relation to the second customer premises.

19. The method of claim 15, wherein the first or second digital asset is a content object.

20. The method of claim 19, wherein the content object is selected from a group consisting of: a recorded audio, a recorded audio, a live video, a recorded video, an email, a live chat, and a game.

21. The method of claim 15, wherein the first or second digital asset is a customer premises equipment.

22. The method of claim 21, wherein the customer premises equipment is selected from a group consisting of: a video recorder, an audio recorder, a storage device, a personal computer, a PDA, a mobile telephone, a dish antenna, a television, a refrigerator, and a security equipment.

23. The method of claim 21, wherein the customer premises equipment includes a gate lock, and a camera.

24. The system of claim 3, wherein authenticating the second network interface device includes registering the at least one second digital security device associated with at least one of the plurality of second digital assets maintained in relation to the customer premises.

25. The system of claim 3, wherein the second network interface device is further operable to access the at least one second digital security device from at least one of the plurality of second digital assets maintained in relation to the customer premises, and to register the at least one second digital security device in relation to at least one of: the global authentication authority and the second local authentication authority.

* * * * *

UNITED STATES PATENT AND TRADEMARK OFFICE
CERTIFICATE OF CORRECTION

PATENT NO. : 7,240,361 B2
APPLICATION NO. : 10/632602
DATED : July 3, 2007
INVENTOR(S) : Steven M. Casey et al.

It is certified that error appears in the above-identified patent and that said Letters Patent is hereby corrected as shown below:

Column 27, claim 15, line 23, delete "devices" and insert --device--

Signed and Sealed this

Eleventh Day of December, 2007

JON W. DUDAS
*Director of the United States Patent and Trademark Office*